US 8,141,533 B2

(12) United States Patent
Demura

(10) Patent No.: US 8,141,533 B2
(45) Date of Patent: Mar. 27, 2012

(54) CONTROL APPARATUS AND METHOD FOR INTERNAL COMBUSTION ENGINE

(75) Inventor: Takayuki Demura, Mishima (JP)

(73) Assignee: Toyota Jidosha Kabushiki Kaisha, Aichi-Ken (JP)

(*) Notice: Subject to any disclaimer, the term of this patent is extended or adjusted under 35 U.S.C. 154(b) by 350 days.

(21) Appl. No.: 12/518,301

(22) PCT Filed: Dec. 11, 2007

(86) PCT No.: PCT/IB2007/003860
§ 371 (c)(1),
(2), (4) Date: Jun. 9, 2009

(87) PCT Pub. No.: WO2008/072063
PCT Pub. Date: Jun. 19, 2008

(65) Prior Publication Data
US 2010/0012086 A1   Jan. 21, 2010

(30) Foreign Application Priority Data

Dec. 11, 2006  (JP) .................................. 2006-333619

(51) Int. Cl.
*F02N 11/08* (2006.01)
*F02N 11/00* (2006.01)
(52) U.S. Cl. .................. 123/179.4; 123/179.3
(58) Field of Classification Search ............... 123/179.4, 123/179.3, 179.5, 179.16, 179.18, 399, 198 DB, 123/90.15, 345–348, 568.14; 701/111–114
See application file for complete search history.

(56) References Cited

U.S. PATENT DOCUMENTS

| | | | |
|---|---|---|---|
| 7,096,841 B2 | 8/2006 | Hattori et al. | |
| 7,131,413 B2 | 11/2006 | Hattori et al. | |
| 2002/0043243 A1 | 4/2002 | Majima | |
| 2003/0106515 A1 | 6/2003 | Kondo | |
| 2005/0022779 A1 | 2/2005 | Hattori et al. | |
| 2006/0169246 A1* | 8/2006 | Asai .............................. | 123/305 |

FOREIGN PATENT DOCUMENTS

| | | |
|---|---|---|
| EP | 1 586 761 A2 | 10/2005 |
| JP | 2002-295288 A | 10/2002 |
| JP | 2005-048718 A | 2/2005 |
| JP | 2005-069049 A | 3/2005 |
| WO | 2006/067581 A1 | 6/2006 |
| WO | 2006/085477 A1 | 8/2006 |

* cited by examiner

*Primary Examiner* — Mahmoud Gimie
(74) *Attorney, Agent, or Firm* — Sughrue Mion, PLLC

(57) ABSTRACT

A control apparatus includes a detection unit that detects a stop request to an engine, a throttle closing control unit that, when the stop request is detected, adjusts an opening amount of a throttle valve to an engine-stop throttle valve opening amount smaller than a current opening amount an engine stop detection unit that detects a stop of the engine, an engine-stop exhaust valve control unit that adjusts an opening/closing characteristic of an exhaust valve of a cylinder that will be placed initially in an intake stroke when the engine is restarted so that, when the opening amount of the throttle valve is adjusted to the engine-stop throttle valve opening amount and a stop of the engine is detected, the exhaust valve has an engine-stop exhaust valve opening/closing characteristic by which a closing timing of the exhaust valve is more delayed than a current closing timing of the exhaust valve.

38 Claims, 24 Drawing Sheets

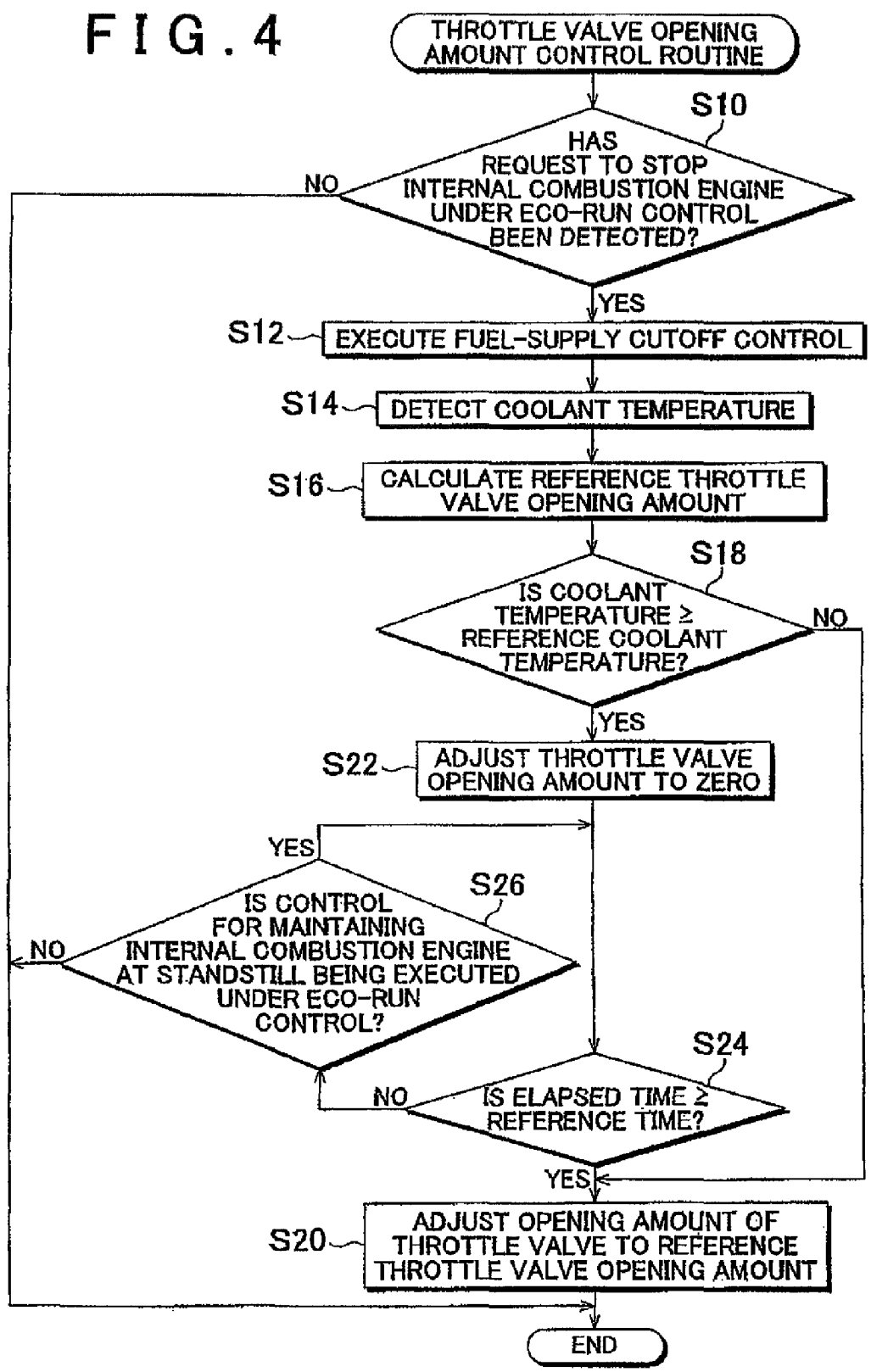

F I G . 29
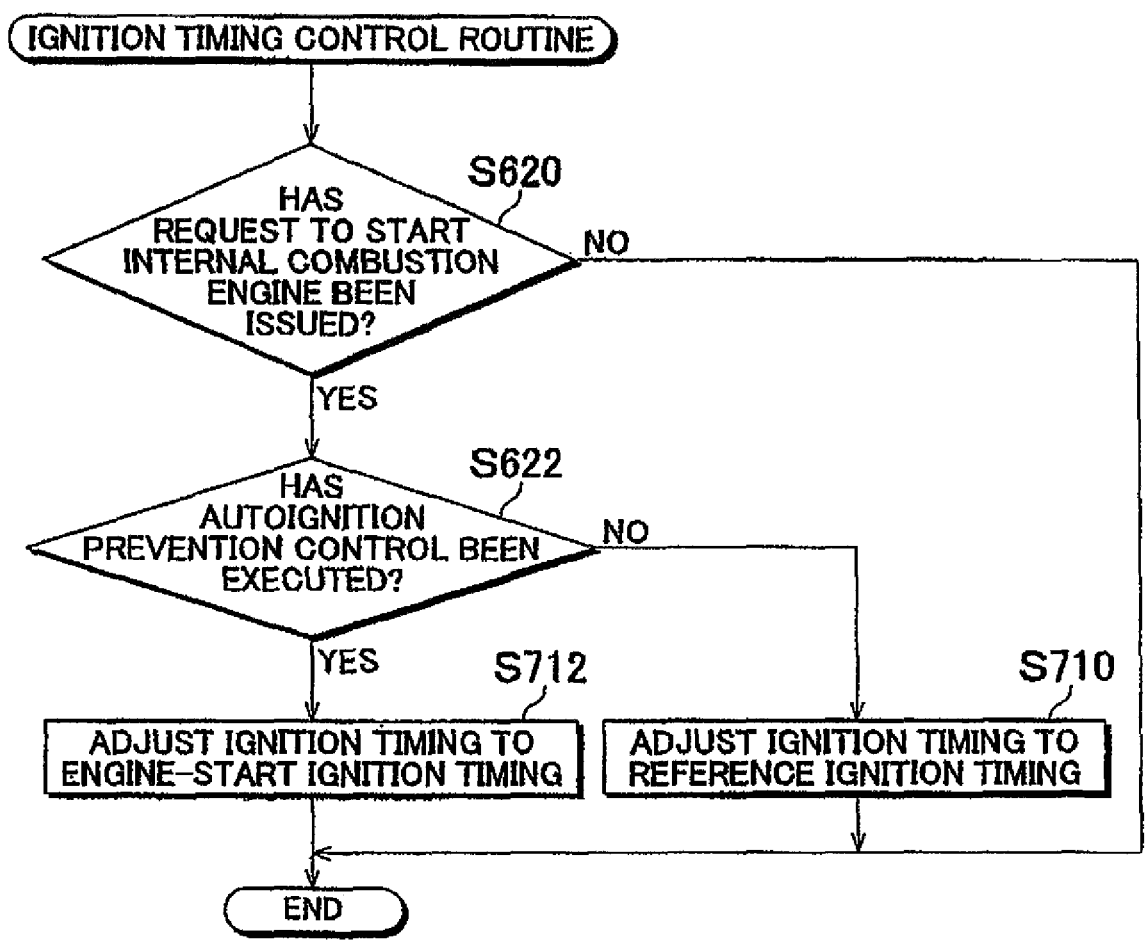

CONTROL APPARATUS AND METHOD FOR INTERNAL COMBUSTION ENGINE

BACKGROUND OF THE INVENTION

1. Field of the Invention

The invention relates generally to a control apparatus and method for an internal combustion engine, and, more specifically, to a control apparatus and method for an internal combustion engine provided with a throttle valve, an intake valve and an exhaust valve, the control apparatus and method controlling the state in a cylinder when the internal combustion engine is at standstill.

2. Description of the Related Art

Japanese Patent Application Publication No. JP-2005-48718 (JP-A-2005-48718) describes a system that prevents autoignition from occurring when an internal combustion engine is being started. The system determines whether the temperature of a coolant in the internal combustion engine is equal to or higher than a predetermined temperature, when a request to start the internal combustion engine is issued. When it is determined that the temperature of the coolant is equal to or higher than the predetermined temperature, there is a high possibility that autoignition will occur when the internal combustion engine is being started.

In such a case, the system according to the related art initiates starting of the internal combustion engine with the closing timing of an intake valve set to the most delayed closing timing. Then, when an initial combustion is detected, the closing timing of the intake valve is advanced to the regular closing timing. If starting of the internal combustion engine is initiated with the closing timing of the intake valve set to the most delayed closing timing, an increase in the pressure in a combustion chamber during a cranking operation is suppressed. Accordingly, the pressure in the combustion chamber is adjusted so as not to reach the lower limit of the pressure range in which it is highly possible that autoignition occurs when the internal combustion engine is started. As a result, occurrence of autoignition is prevented. Other related arts are described in Japanese Patent Application Publication No. 2005-69049 (JP-A-2005-69049), Japanese Patent Application Publication No. 2002-295288 (JP-A-2002-295288), and Japanese Patent Application Publication No. 2003-262138 (IP-A-2003-262138).

A system that executes a so-called eco-run control for automatically stopping and starting an internal combustion engine has been suggested in order to enhance the fuel efficiency of the internal combustion engine. More specifically, the system that executes the eco-run control automatically stops the operation of the internal combustion engine, when the operating state of the internal combustion engine satisfies a predetermined stop condition. When a predetermined start condition is satisfied after the operation of the internal combustion engine has been stopped, the system automatically starts the operation of the internal combustion engine.

However, when the eco-run control described above is executed, the internal combustion engine may be stopped and started frequently within a short time. Therefore, in many cases, the internal combustion engine is started while the temperature in a cylinder is still high after the internal combustion engine has been stopped. When the temperature in the cylinder is high, autoignition is likely to occur. Occurrence of autoignition may be prevented by executing the control according to the related art described above. In this ease, however, each time the internal combustion engine is started, it is necessary to detect the temperature of a coolant needs, determine whether the temperature of the coolant is equal to or higher than a predetermined temperature, and set the closing timing of an intake valve needs to the most delayed closing timing. However, if the closing timing is at the most delayed closing timing when the internal combustion engine is being started, the startability of the internal combustion engine may be deteriorated because of a decrease in the compression ratio, etc. When the internal combustion engine is automatically stopped and started frequently within a short time, for example, when the eco-run control is executed, it is desirable to execute a control under which the internal combustion engine is started with higher startability.

SUMMARY OF THE INVENTION

The invention provides a control apparatus and method for an internal combustion engine, which is improved to prevent autoignition when the internal combustion engine is started while improving the startability.

A first aspect of the invention provides a control apparatus that includes a stop request detection unit, a throttle valve closing unit, an engine stop detection unit and an engine-stop exhaust valve control unit. The stop request detection unit detects a stop request to the internal combustion engine. The throttle closing control unit adjusts an opening amount of a throttle valve, which is arranged in an intake pipe of the internal combustion engine, to an engine-stop throttle valve opening amount when the stop request is detected, wherein the engine-stop throttle valve opening amount is smaller than a current opening amount. The engine stop detection unit detects a stop of the internal combustion engine. The engine-stop exhaust valve control unit adjusts an opening/closing characteristic of an exhaust valve of a specific intake-stroke cylinder that will be placed initially in an intake stroke when the internal combustion engine is restarted so that, when the opening amount of the throttle valve is adjusted to the engine-stop throttle valve opening amount and a stop of the internal combustion engine is detected, the exhaust valve has an engine-stop exhaust valve opening/closing characteristic by which a closing timing of the exhaust valve is more delayed than a current closing timing of the exhaust valve.

A second aspect of the invention may further include, in the first aspect of the invention, a coolant temperature detection unit that detects a coolant temperature of the internal combustion engine, and a coolant temperature determination unit that determines whether the coolant temperature is equal to or higher than a reference coolant temperature, wherein the throttle valve closing unit further adjusts the opening amount of the throttle valve to the engine-stop throttle valve opening amount when it is determined that the coolant temperature is equal to or higher than the reference coolant temperature.

A third aspect of the invention may further include, in the first or second aspect of the invention, an intake air temperature detection unit that detects an intake air temperature of the internal combustion engine, and an intake air temperature determination unit that determines whether the intake air temperature is equal to or higher than a reference intake air temperature, wherein the throttle valve closing unit further adjusts the opening amount of the throttle valve to the engine-stop throttle valve opening amount when it is determined that the intake air temperature is equal to or higher than the reference intake air temperature.

A fourth aspect of the invention may further include, in any one of the first to third aspects of the invention, a stop position detection unit that detects a stop position of a piston of the specific intake-stroke cylinder when the internal combustion engine is stopped, and a stop position determination unit that determines whether the stop position is within a stop range from a top dead center on an intake stroke to a position that is obtained by delaying 90 degrees from the top dead center on the intake stroke, wherein the engine-stop exhaust valve control unit adjusts the opening/closing characteristic of the exhaust valve to the engine-stop exhaust valve opening/closing characteristic when the stop position is within the stop range.

A fifth aspect of the invention may further include, in any one of the first to fourth aspects of the invention, an elapsed time detection unit that detects an elapsed time that has elapsed since the throttle valve is adjusted to the engine-stop throttle valve opening amount, an elapsed time determination unit that determines whether the elapsed time is equal to or longer than a reference time, a reference throttle valve control unit that, when the elapsed time is equal to or longer than the reference time, sets the opening amount of the throttle valve to a reference opening amount that is used when the internal combustion engine is stopped, and a pre-start exhaust valve control unit that sets the opening/closing characteristics of the exhaust valve to an engine-start exhaust valve opening/closing characteristic that is used when the internal combustion engine is restarted, when the opening amount of the throttle valve is set to the reference opening amount.

A sixth aspect of the invention may further include, in any one of the first to fifth aspects of the invention, a coolant temperature detection unit that detects a coolant temperature of the internal combustion engine, and an engine-stop exhaust valve opening/closing characteristic setting unit that sets the engine-stop exhaust valve opening/closing characteristic based on the coolant temperature.

A seventh aspect of the invention may further include, in any one of the first to sixth aspects of the invention, an intake air temperature detection unit that detects an intake air temperature of the internal combustion engine, and an engine-stop exhaust valve opening/closing characteristic setting unit that sets the engine-stop exhaust valve opening/closing characteristic based on the intake air temperature.

An eighth aspect of the invention may further include, in any one of the first to seventh aspects of the invention, a stop position detection unit that detects a stop position of a piston of the specific intake-stroke cylinder, and an engine-stop exhaust valve opening/closing characteristic setting unit that sets the engine-stop exhaust valve opening/closing characteristic based on the stop position.

A ninth aspect of the invention may further include, in any one of the first to eighth aspects of the invention, an engine-stop intake valve control unit that adjusts an opening/closing characteristic of an intake valve of the specific intake-stroke cylinder so that an opening amount of the intake valve becomes an engine-stop reference opening amount when the opening amount of the throttle valve is adjusted to the engine-stop throttle valve opening amount and the internal combustion engine is stopped.

A tenth aspect of the invention may further include, in the ninth aspect of the invention, a coolant temperature detection unit that detects a coolant temperature of the internal combustion engine, and an engine-stop reference opening amount correction unit that corrects the engine-stop reference opening amount based on the coolant temperature.

An eleventh aspect of the invention may further include, in the ninth or tenth aspect of the invention, an intake air temperature detection unit that detects an intake air temperature of the internal combustion engine, and an engine-stop reference opening amount correction unit that corrects the engine-stop reference opening amount based on the intake air temperature.

A twelfth aspect of the invention may further include, in any one of the ninth to eleventh aspects of the invention, a stop position detection unit that detects a stop position of a piston of the specific intake-stroke cylinder, and an engine-stop reference opening amount correction unit that corrects the engine-stop reference opening amount on the basis of the stop position.

A thirteenth aspect of the invention may further include, in any one of the ninth to twelfth aspects of the invention, an elapsed time detection unit that detects an elapsed time that has elapsed since the opening amount of the throttle valve is adjusted to the engine-stop throttle valve opening amount, an elapsed time determination unit that determines whether the elapsed time is equal to or longer than a reference time, and a pre-start intake valve control unit that sets the opening amount of the intake valve to an engine-start intake valve opening/closing characteristic when the internal combustion engine is restarted when it is determined that the elapsed time is equal to or longer than the reference time.

A fourteenth aspect of the invention may be configured so that, in any one of the first to thirteenth aspects of the invention the engine-stop throttle valve opening amount is an opening amount by which the opening amount of the throttle valve is fully closed.

A fifteenth aspect of the invention may further include, in any one of the first to thirteenth aspects of the invention, a coolant temperature detection unit that detects a coolant temperature of the internal combustion engine, and an engine-stop throttle valve opening amount setting unit that sets the engine-stop throttle valve opening amount based on the coolant temperature.

A sixteenth aspect of the invention may further include, in any one of the first to thirteenth aspects of the invention, an intake air temperature detection unit that detects an intake air temperature of the internal combustion engine, and an engine-stop throttle valve opening amount setting unit that sets the engine-stop throttle valve opening amount based on the intake air temperature.

A seventeenth aspect of the invention may further include, in any one of the first to sixteenth aspects of the invention, an opening amount detection unit that detects an opening amount of an intake valve and the opening amount of the exhaust valve when the internal combustion engine is at standstill, and a fuel injection amount setting unit that sets a fuel injection amount of the specific intake-stroke cylinder when the internal combustion engine is started based on the opening amount of the intake valve, the opening amount of the exhaust valve and the engine-stop throttle valve opening amount.

An eighteenth aspect of the invention may further include, in any one of the first to seventeenth aspects of the invention, an opening amount detection unit that detects an opening amount of an intake valve and the opening amount of the exhaust valve when the internal combustion engine is at standstill, and an ignition timing setting unit that sets an ignition timing when the internal combustion engine is started based on the opening amount of the intake valve, the opening amount of the exhaust valve and the engine-stop throttle valve opening amount.

A nineteenth aspect of the invention may further include, in any one of the first to eighteenth aspects of the invention, a stop condition determination unit that determines whether a stop condition of the internal combustion engine is satisfied based on all operating state of the internal combustion engine, an engine stop unit that stops the internal combustion engine when it is determined that the stop condition is satisfied, a start condition determination unit that determines whether a start condition is satisfied after the internal combustion engine has been stopped, and an engine start unit that starts the internal combustion engine when it is determined that the start condition is satisfied.

A twentieth aspect of the invention provides a method of controlling an internal combustion engine that includes detecting a stop request to the internal combustion engine, adjusting an opening amount of a throttle valve, which is arranged in an intake pipe of the internal combustion engine, to an engine-stop throttle valve opening amount when the stop request is detected, the engine-stop throttle valve opening amount being smaller than a current opening amount, detecting a stop of the internal combustion engine, and adjusting an opening/closing characteristic of an exhaust valve of a specific intake-stroke cylinder that will be placed initially in an intake stroke when the internal combustion engine is restarted so that, when the opening amount of the throttle valve is adjusted to the engine-stop throttle valve opening amount and a stop of the internal combustion engine is detected, the exhaust valve has an engine-stop exhaust valve opening/closing characteristic by which a closing timing of the exhaust valve is more delayed than a current closing timing of the exhaust valve.

According to the first aspect of the invention, when a request to stop the internal combustion engine is detected, the opening amount of the throttle valve, which is arranged in tile intake pipe of the internal combustion engine, is adjusted to an engine-stop throttle valve opening amount that is smaller than a current opening amount, and, when a stop of the internal combustion engine is detected, the opening/closing characteristic of the exhaust valve of a specific intake-stroke cylinder that is initially placed in an intake stroke when the internal combustion engine is restarted is adjusted to an engine-stop exhaust valve opening/closing characteristic by which a closing timing of the exhaust valve is more delayed than a current closing timing of the exhaust valve. Thus, by setting the throttle valve to a closing side, a negative pressure is produced on a side adjacent to an intake port. In this state, when the exhaust valve of the specific intake-stroke cylinder is delayed, the exhaust valve is made open. Thus, because of the negative pressure generated on the intake port side, exhaust gas on a side adjacent to an exhaust port is drawn into the cylinder and thereby making it possible to increase the amount of exhaust gas recirculated back into the initial intake-stroke cylinder Therefore, because it is possible to decrease the rate of newly-taken air amount to the intake air amount in the specific cylinder when the internal combustion engine is restarted, occurrence of autoignition may be suppressed. In addition, the above control is initiated immediately after a request to stop the internal combustion engine is issued, and is executed during stop control. Thus, in comparison with the case where autoignition prevention control is performed When the internal combustion engine is started, it is possible to improve the startability.

According to the second or third aspect of the invention, the opening amount of the throttle valve is adjusted to the engine-stop throttle valve opening amount when the coolant temperature or the intake air temperature of the internal combustion engine is equal to or higher than the reference temperature. That is, only when autoignition is likely to occur when the internal combustion engine is being started, a negative pressure is generated to increase the amount of exhaust gas recirculated back to the cylinder. Hence, it is possible to effectively execute a control of autoignition prevention only when necessary.

According to the fourth aspect of the invention, the opening amount of the throttle valve is adjusted to the engine-stop throttle valve opening amount only when the stop position of the piston of the specific intake-stroke cylinder when the internal combustion engine is stopped is within the stop range from the top dead center on an intake stroke to a position that is obtained by delaying 90 degrees from the top dead center on the intake stroke. Thus, when it is possible to effectively prevent autoignition by generating a negative pressure to increase the amount of exhaust gas recirculated back into the cylinder, it is possible to selectively execute autoignition prevention control.

According to the fifth aspect of the invention, when the elapsed time that has elapsed since the opening amount of the throttle valve is adjusted to the engine-stop throttle vale opening amount is equal to or longer than the reference time, the opening amount of the throttle valve is set to the reference throttle valve opening amount, which is a reference opening amount when the internal combustion engine is at standstill, while the opening/closing characteristic of the exhaust valve is set to the engine-start exhaust valve opening/closing characteristic when the internal combustion engine is restarted In this manner, because autoignition prevention control may be completed when the internal combustion engine is at standstill and the opening amount of the throttle valve may be set to the opening/closing characteristic of the exhaust valve based on an operating state that is established when the internal combustion engine is restarted, it is possible to further improve the startability.

According to any one of the sixth to eighth aspects of the invention, the engine-stop exhaust valve opening/closing characteristic is set based on a coolant temperature, an intake air temperature of the internal combustion engine or a piston stop position of the specific intake-stroke cylinder. Thus, it is possible to control the amount of exhaust gas recirculated back to the specific intake-stroke cylinder and, as a result, it is possible to further reliably prevent autoignition when the internal combustion engine is started.

According to the ninth aspect of the invention, the opening/closing characteristic of the intake valve is adjusted so that, when the opening amount of the throttle valve is adjusted to the engine-stop throttle valve opening amount and the internal combustion engine is stopped, the opening amount of the intake valve of the specific intake-stroke cylinder becomes the engine-stop reference opening amount. In this manner, because it is possible to make the opening amount on the intake port side be constant, it is possible to further accurately adjust the amount of exhaust gas recirculated back to the cylinder. Thus, it is possible to further reliably prevent occurrence of autoignition when the internal combustion engine is started.

According to any one of the tenth to twelfth aspects of the invention, the engine-stop reference opening amount of the intake valve is corrected based on a coolant temperature, an intake air temperature of the internal combustion engine or a piston stop position of the specific intake-stroke cylinder Thus, it is possible to control the amount of exhaust gas recirculated back to the specific intake-stroke cylinder based on the likelihood of occurrence of autoignition and, as a result, it is possible to further reliably prevent autoignition when the internal combustion engine is started.

According to the thirteenth aspect of the invention, when the elapsed time that has elapsed since the opening amount of the throttle valve is adjusted to the engine-stop throttle valve opening amount is equal to or longer than the reference time, the opening/closing characteristic of the intake valve is set to the engine-start intake valve opening/closing characteristic when the internal combustion engine is restarted. Thus, because it is possible to control the intake valve, while the internal combustion engine is stopped, to the state of the intake valve that is established when the internal combustion engine is started, it is possible to further improve the startability.

According to the fourteenth aspect of the invention, the engine-stop throttle valve opening amount is an opening amount by which the opening amount of the throttle valve is fully closed. In this manner, it is possible to increase a negative pressure on the intake portion side while a control to stopping the internal combustion engine is being executed. As a result, it is possible to reliably flow exhaust gas back into the cylinder and thereby to increase the amount of exhaust gas recirculated back to the cylinder.

According to the fifteenth or sixteenth aspect of the invention, the engine-stop throttle valve opening amount when the internal combustion engine is stopped is set based on a coolant temperature or an intake air temperature. Thus, by adjusting the opening amount of the throttle valve based on the likelihood of autoignition, it is possible to control the magnitude of negative pressure generated. In this manner, it is possible to adjust the amount of exhaust gas recirculated back to the specific intake-stroke cylinder based on the coolant temperature or the intake air temperature and, as a result, it is possible to further reliably prevent autoignition when the internal combustion engine is started.

According to the seventeenth aspect of the invention, the fuel injection amount, when the internal combustion engine is started, is set based on the opening amounts of the intake valve and exhaust valve while the internal combustion engine is stopped, and also based on the engine-stop throttle valve opening amount. Thus, it is possible to set an appropriate fuel injection amount based on the state of the specific intake-stroke cylinder when the internal combustion engine is started. As a result, it is possible to further improve the startability.

According to the eighteenth aspect of the invention, the ignition timing, when the internal combustion engine is started, is set based on the opening amounts of the intake valve and exhaust valve while the internal combustion engine is stopped, and also based on the engine-stop throttle valve opening amount. Thus, it is possible to set an appropriate ignition timing based on the state of the specific intake-stroke cylinder when the internal combustion engine is started. As a result, it is possible to further improve the startability.

According to the eighteenth aspect of the invention, the internal combustion engine is stopped when it is determined that a stop condition is satisfied, and the internal combustion engine is started when it is determined that a start condition is satisfied. As described above, when an engine stop or an engine start is automatically determined based on the operating state of the internal combustion engine, and the engine stop or the engine start is automatically performed, it is assumed that the internal combustion engine tends to be started tinder the condition that a temperature in the cylinder is high and, therefore, the likelihood of occurrence of autoignition increases. Thus, it is further effective to prevent occurrence of autoignition by the aspects of the invention. In addition, the autoignition prevention control according to the nineteenth aspect of the invention is executed when a control to stop the internal combustion engine is executed, so that it is possible to improve the startability.

BRIEF DESCRIPTION OF THEE DRAWINGS

The foregoing and further features and advantages of the invention will become apparent from the following description of example embodiments with reference to the accompanying drawings, wherein the same or corresponding portions will be denoted by the same reference numerals and wherein:

FIG. 4 is a flowchart showing the routine of a throttle valve opening amount control executed by an ECU in the first embodiment of the invention;

FIG. 29 is a flowchart showing the routine of the ignition timing control executed by the ECU in the seventh embodiment of the inventions.

DETAILED DESCRIPTION OF THE EMBODIMENTS

Figure 1:
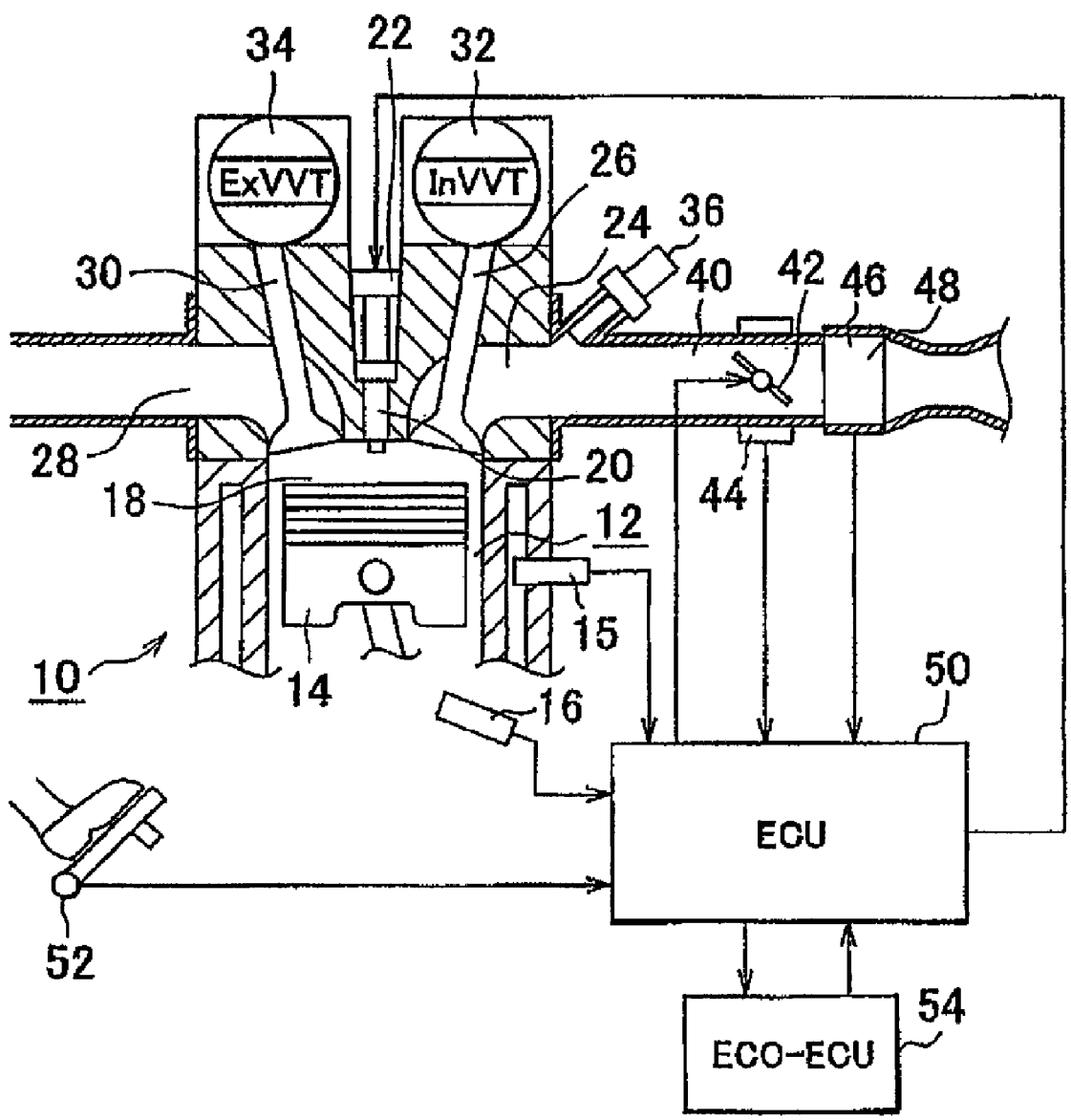
FIG. 1 is a view schematically showing the structure of a system according to a first embodiment of the invention.

Hereafter, embodiments of the invention will be described with reference to the accompanying drawings. The same or corresponding portions will be denoted by the same reference numerals, and the detailed description thereof will be provided only once below.

First Embodiment of the Invention

Structure of System According to First Embodiment of the Invention

FIG. 1 is a view schematically showing the structure of an internal combustion engine system according to a first embodiment of the invention. The system shown in FIG. 1 includes an internal combustion engine 10. The internal combustion engine 10 includes cylinders 12. Although FIG. 1 shows the cross-section of only one cylinder 12, the internal combustion engine 10 actually includes the plurality of cylinders 12. A piston 14 is arranged in each of the cylinders 12. Each piston 14 is connected to a crankshaft (not shown) via a connecting rod. A coolant temperature sensor 15 (a coolant temperature detection unit) 15 that detects the temperature of a coolant is fitted to each cylinder 12. An engine speed sensor 16 that transmits a signal indicating the rotational speed of the internal combustion engine 10 is provided near the crankshaft.

A spark plug 20 is fitted at the center of the ceiling (cylinder head) of a combustion chamber 18, which is formed within the cylinder 12 at a position above the piston 14, in such a manner that the spark gap of the spark plug 20, provided at the distal end, protrudes into the combustion chamber 18. The spark plug 20 ignites the fuel supplied into the combustion chamber 18 by spark discharging. The ignition timing at which the spark plug 20 ignites the fuel is electrically controlled via an actuator 22.

An intake valve 26 is arranged in an intake port 24 of each cylinder 12 of the internal combustion engine 10, and an exhaust valve 30 is arranged in an exhaust port 28 of each cylinder 12 of the internal combustion engine 10. A variable valve mechanism 32 and a variable valve mechanism 34 are connected to the intake valve 26 and the exhaust valve 30, respectively. The variable valve mechanism 32 changes the opening/closing characteristic (for example, the opening/closing timing and the lift amount) of the intake valve 26 for the corresponding cylinder, 12 independently of the opening/closing characteristics of the intake valves 26 for the other cylinders 12. Similarly, the variable valve mechanism 34 changes the opening/closing characteristic (for example, the opening/closing timing and the lift amount) of the exhaust valve 30 for the corresponding cylinder 12, independently of the opening/closing characteristics of the exhaust valves 30 for the other cylinders 12.

The internal combustion engine 10 includes a port injector 36 that is arranged in such a manner that the injection port formed at the tip thereof faces the intake port 24. The port injector 36 is a fuel injection device that injects fuel into the intake port 24. The fuel injected from the port injector 36 is mixed with the air in the intake port 24, and the air-fuel mixture is taken into the cylinder 12.

An intake pipe 40, which is shared by all the cylinders 12, is connected to the intake ports 24 of the cylinders 12. An electronically-controlled throttle valve 42 is provided in the intake pipe 40. The flow rate of the air flowing into the intake pipe 40 is adjusted by changing the opening amount of the throttle valve 42. The opening amount of the throttle valve 42 (hereinafter, referred to as the "throttle valve opening amount" where appropriate) is electrically controlled via an actuator 44 based on a request to accelerate or decelerate the vehicle, which is issued, for example, by operating an accelerator pedal. The throttle valve opening amount may be controlled independently of the accelerator pedal operation amount.

An airflow meter 46 is provided in the intake pipe 40, at a position upstream of the throttle valve 42. The airflow meter 46 transmits a signal indicating the flow rate of the air flowing into the intake pipe 40. An intake air temperature sensor 48 (an intake air temperature detection unit) is embedded in the airflow meter 46. The intake air temperature sensor 48 transmits a signal indicating the temperature of the air passing through the airflow meter 46.

The internal combustion engine system according to the first embodiment of the invention includes an ECU (Electronic Control Unit) 50 that serves as a control unit for the internal combustion engine 10. The ECU 50 is electrically connected to various sensors, such as the coolant temperature sensor 15, the engine speed sensor 16, the airflow meter 46, the intake air temperature sensor 48 and the accelerator pedal operation amount sensor 52, and also connected to the actuator 22 for the spark plug 20, the actuator 44 for the throttle valve 42, the variable valve mechanisms 32 and 34, etc. The ECU 50 obtains the information concerning the operating state, etc. of the internal combustion engine 10 from the various sensors. The ECU 50 performs computations based on the obtained information to control the operating state of the internal combustion engine 10. More specifically, when a request to start the internal combustion engine 10 is issued, the ECU 50 drives a starter to mesh the gear of the starter with the gear on the internal combustion engine 10 side, thereby cranking up the internal combustion engine 10. Also, the ECU 50 prepares control signals for controlling the ignition timing, the throttle valve opening amount, the opening/closing timing of the intake valve, the opening/closing timing of the exhaust valve, etc. based on the obtained information, and transmits the control signals to the actuators 22 and 44 and the variable valve mechanisms 32 and 34, when required.

The internal combustion engine system further includes an ECO-ECU 54 that serves as an eco-run control unit. The ECO-ECU 54 executes an eco-run control by issuing a request to stop the internal combustion engine 10 when the internal combustion engine 10 is idling, and issuing a request to start the internal combustion engine 10 immediately before the vehicle starts moving. More specifically, the ECU-ECU 54 determines whether predetermined stop conditions are satisfied, for example, whether the vehicle speed is zero and a brake is operated. When it is determined that the predetermined stop conditions are satisfied, the ECO-ECU 54 issues a request to stop the internal combustion engine 10 to the ECU 50. On the other hand, when it is determined that at least one of the stop conditions is no longer satisfied (when a start condition is satisfied), the ECO-ECU 54 issues a request to start the internal combustion engine 10 to the ECU 50. The ECU 50 executes a control for stopping or starting the internal combustion engine 10 according to a request to stop or start the internal combustion engine 10, which is issued by the ECO-ECU 54.

Distinctive Control in System According to First Embodiment of the Invention

As described above, the internal combustion engine 10 is frequently stopped and started under the eco-run control. In such a case, the coolant temperature and the intake air temperature are high, especially when the internal combustion engine 10 is being started. Also, when the piston 14 is at a position near the BDC (bottom dead center) on the intake stroke when the piston 14 is stopped, a large amount of air may be present in the cylinder 2 and the temperature of the air in the cylinder 2 may become high while the internal combustion engine 10 is at standstill. Accordingly, especially in the first compression stroke that takes place when the internal combustion engine 10 is being started, the temperature of the air-fuel mixture may become high and therefore combustion may be spontaneously started in the cylinder 12 before the fuel is ignited by the spark plug 20 (i.e., autoignition may occur). Occurrence of autoignition may cause vibration, reduction in the combustion efficiency, deterioration in the startability of the internal combustion engine 10 due to the reduction in the combustion efficiency, etc. Therefore, the system according to the first embodiment of the invention executes an autoignition prevention control, described below in detail, in order to prevent autoignition that may occur when the internal combustion engine 10 is being started under the eco-run control.

The autoignition prevention control is executed when the following conditions 1) and 2) are satisfied.

The condition 1) is a condition that the temperature of a coolant in the internal combustion engine 10 is equal to or higher than a reference temperature. The reference temperature is set in advance, for example, by experiment. If the coolant temperature is equal to or higher than the reference temperature, there is a high possibility that autoignition will occur when the internal combustion engine 10 is being started.

The condition 2) is a condition that the stop position of the piston 14, which is arranged within the first cylinder where the intake stroke takes place first from among all the cylinders when the internal combustion engine 10 is being started (hereinafter, referred to as the "initial intake-stroke cylinder"), is within a range from the TDC on the intake stroke to the position 90 degrees after the TDC on the intake stroke (hereinafter, referred to as a "stop range"). When the stop position of the piston (hereinafter, referred to as the "piston stop position" where appropriate) is within the stop range, autoignition is effectively prevented by executing the autoignition prevention control when the internal combustion engine is being started.

When the above-described conditions 1) and 2) are satisfied, if a request to stop the internal combustion engine 10 issued by the ECO-ECU 54 is detected, the opening amount of the throttle valve 42 is adjusted to zero (i.e., the engine-stop throttle valve opening amount). Thus, during a period from when issuance of a request to stop the internal combustion engine 10 is detected until when the internal combustion engine 10 is actually stopped, a negative pressure is formed in the intake pipe 40, at a position downstream of the throttle valve 42, and the negative pressure gradually increases.

Figure 2:
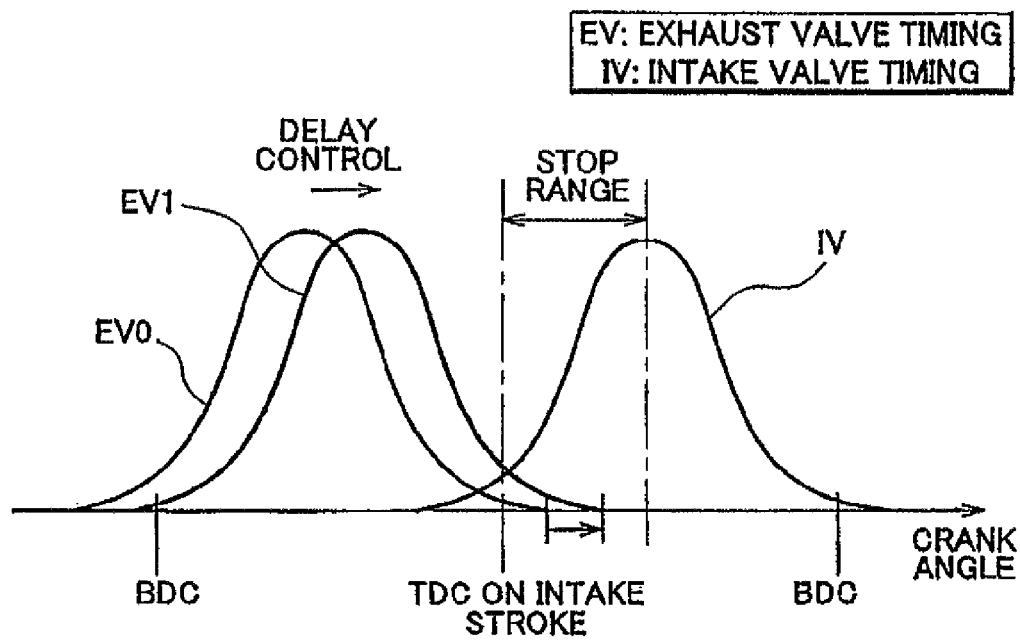
FIG. 2 is a graph illustrating a control for delaying the valve timing of an exhaust valve in an autoignition prevention control according to the first embodiment of the invention.

FIG. 2 is a graph illustrating the opening/closing characteristic of the exhaust valve 30, which is exhibited when the autoignition prevention control is executed in the first embodiment of the invention. In FIG. 2, the abscissa axis represents the crank angle, and the ordinate axis represents the lift amounts of the intake valve 26 and the exhaust valve 30. When the internal combustion engine 10 is stopped under the eco-run control, the opening/closing characteristic of the exhaust valve 30 is usually adjusted to the reference opening/closing characteristic, which is set in the regular stop control and which is indicated by the solid line EV0 in FIG. 2.

When the above-described conditions 1) and 2) are satisfied and therefore the autoignition prevention control is executed, the opening/closing characteristic of the exhaust valve 30 of the initial intake-stroke cylinder is adjusted to the opening/closing characteristic indicated by the solid line EV1 in FIG. 2 when the internal combustion engine 10 is at standstill. Namely, with the system according to the first embodiment of the invention, when the autoignition prevention control is executed, the opening/closing characteristic of the exhaust valve 30 of the initial intake-stroke cylinder is adjusted to the opening/closing characteristic (EV1) (engine-stop opening/closing characteristic) that is achieved by making a correction to the opening/closing characteristic (EV0) of the exhaust valve 30, which is set in the regular stop control, in such a manner that the valve timing of the exhaust valve 30 is delayed. As a result, the closing timing of the exhaust valve 30 is delayed. The amount, by which the closing timing of the exhaust valve 30 is delayed, is set in advance to a predetermined reference delay amount X0. If the closing timing of the exhaust valve 30 is delayed by the reference delay amount X0, the closing timing EVC of the exhaust valve 30 is at least after the piston 14 in the initial intake-stroke cylinder is stopped. Namely, during the autoignition prevention control, the exhaust valve 30 of the initial intake-stroke cylinder is kept open by the control for delaying the closing timing of the exhaust valve 30.

A high negative pressure has been formed in the intake pipe 40, at a position close to the intake port 24 by executing the control for fully closing the throttle valve 42 during the control for stopping the internal combustion engine 10. Accordingly, if the exhaust valve 30 of the initial intake-stroke cylinder is open in this state, the exhaust gas flows into the cylinder 12 through the exhaust port 28. As a result, the amount of exhaust gas recirculated back into the initial intake-stroke cylinder is increased.

Figure 3:
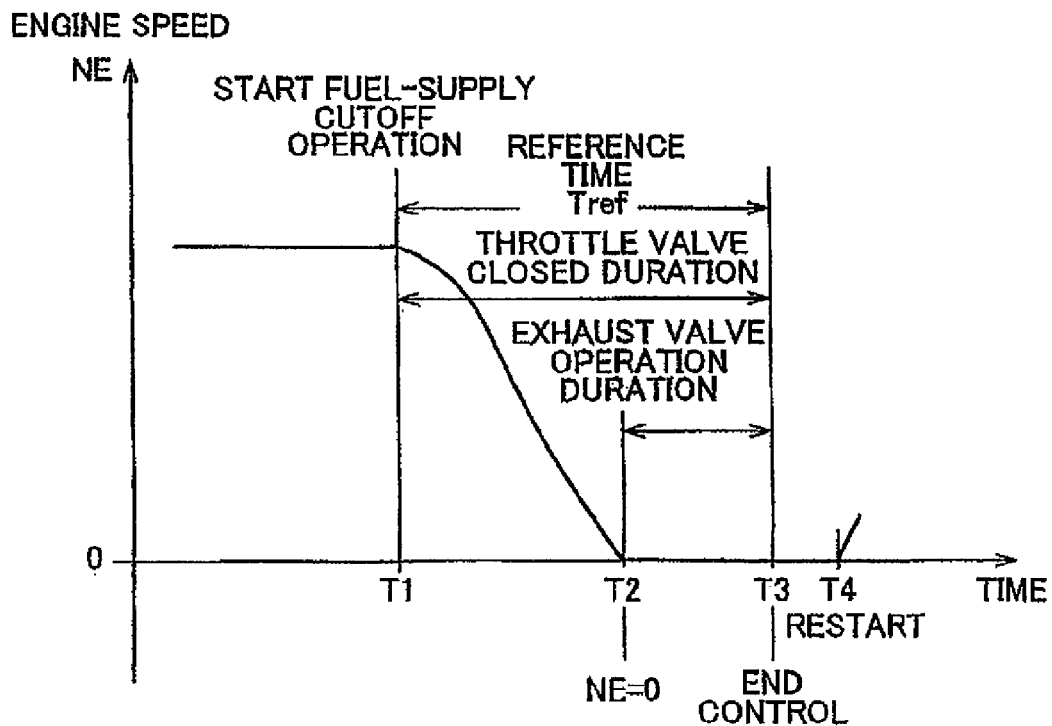
FIG. 3 is a timing chart illustrating the autoignition prevention control according to the first embodiment of the invention.

FIG. 3 is a timing chart illustrating the autoignition prevention control executed when the internal combustion engine 10 is at standstill. As shown in FIG. 3, if a request to stop the internal combustion engine 10 is detected, a fuel-supply cutoff operation is started and the throttle valve 42 is fully closed at time T1.

After that, when it is determined that the internal combustion engine 10 is stopped, more specifically, at time T2 at which the engine speed becomes equal to zero, the opening/closing characteristic of the exhaust valve 30 is adjusted to the predetermined opening/closing characteristic (EV1) so that the closing timing of the exhaust valve 30 is delayed, while the throttle valve 42 is kept fully closed. At this time, a high negative pressure has been formed in the intake pipe 40, at a position close to the intake port 24 because the throttle valve 42 is fully closed. Accordingly, if the exhaust port 28 of the initial intake-stroke cylinder is kept open by delaying the closing timing of the exhaust valve 30, the exhaust gas flows into the initial intake-stroke cylinder.

After that at time T3 at which the time that has elapsed since the throttle valve 42 is fully closed becomes equal to the reference time Tref; the opening amount of the throttle valve 42 is set to the reference throttle valve opening amount, which is the regular opening amount that is achieved when the internal combustion engine 10 is at standstill. The opening/closing characteristic of the exhaust valve 30 of the initial intake-stroke cylinder is set to the regular opening/closing characteristic which is achieved when the internal combustion engine 10 is being started (engine-start exhaust valve opening/closing characteristic). Then, when the start condition is satisfied, a request to start the internal combustion engine 10 is issued from the ECO-ECU 54 to the ECU 50. At time T4, starting of the internal combustion engine 10 is initiated. The above-described control is executed so that the amount of exhaust gas recirculated back into the initial intake-stroke cylinder is increased when the internal combustion engine 10 is at standstill. Therefore, even when the temperature in the cylinder 12 of the internal combustion engine 10 is high, occurrence of autoignition during the initial intake stroke is suppressed.

The system according to the first embodiment of the invention includes the variable valve mechanisms 32 and 34 that control the intake valve 26 and the exhaust valve 30 of the corresponding cylinder, independently of the intake valves 26 and the exhaust valve 30 of the other cylinders. Therefore, in the autoignition prevention control, it is possible to execute the control for delaying the opening/closing timing of only the exhaust valve 30 of the initial intake-stroke cylinder.

Figure 5A:
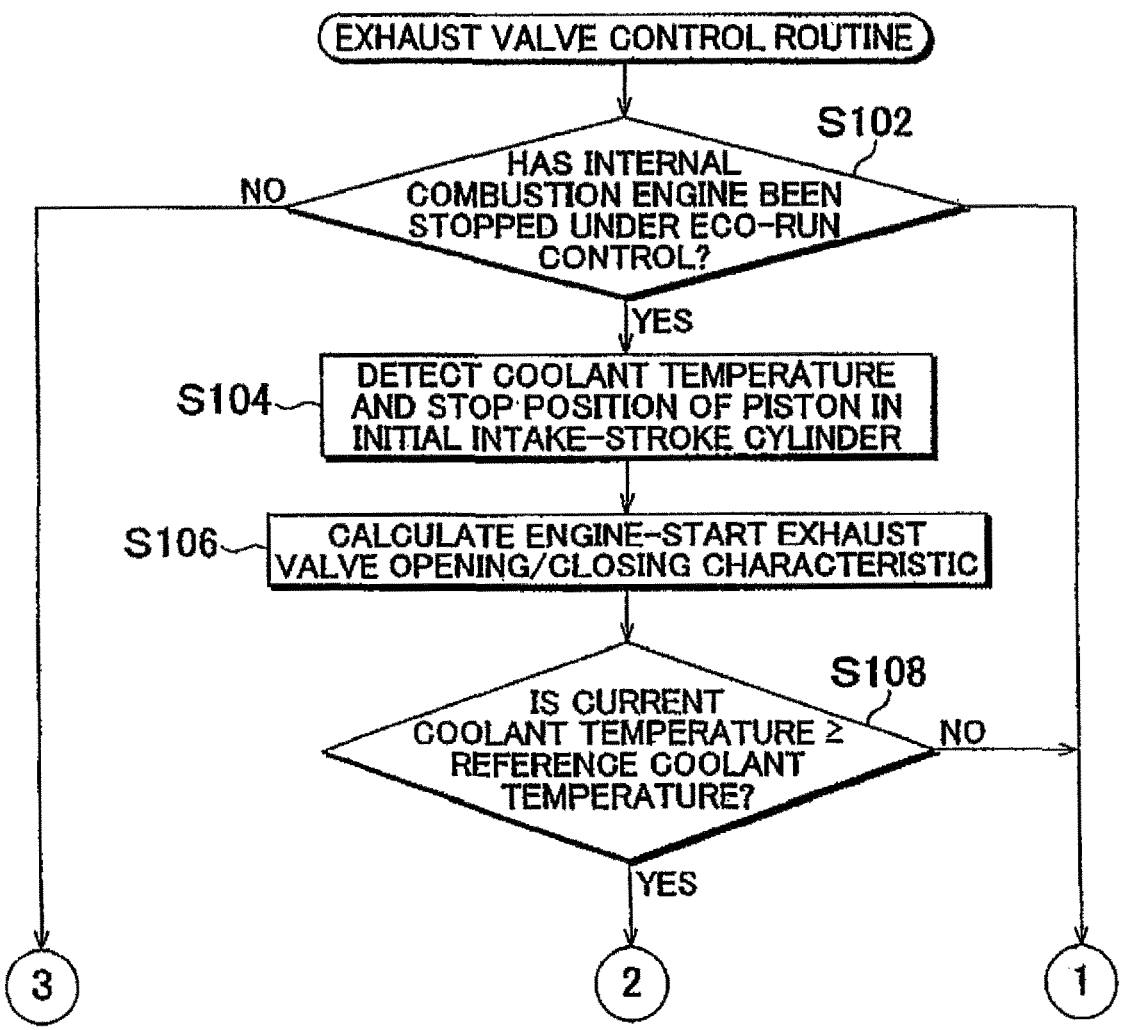
FIG. 5A and FIG. 5B are flowcharts showing the routine of an exhaust valve opening/closing characteristic control executed by the ECU in the first embodiment of the invention.
Figure 5B:
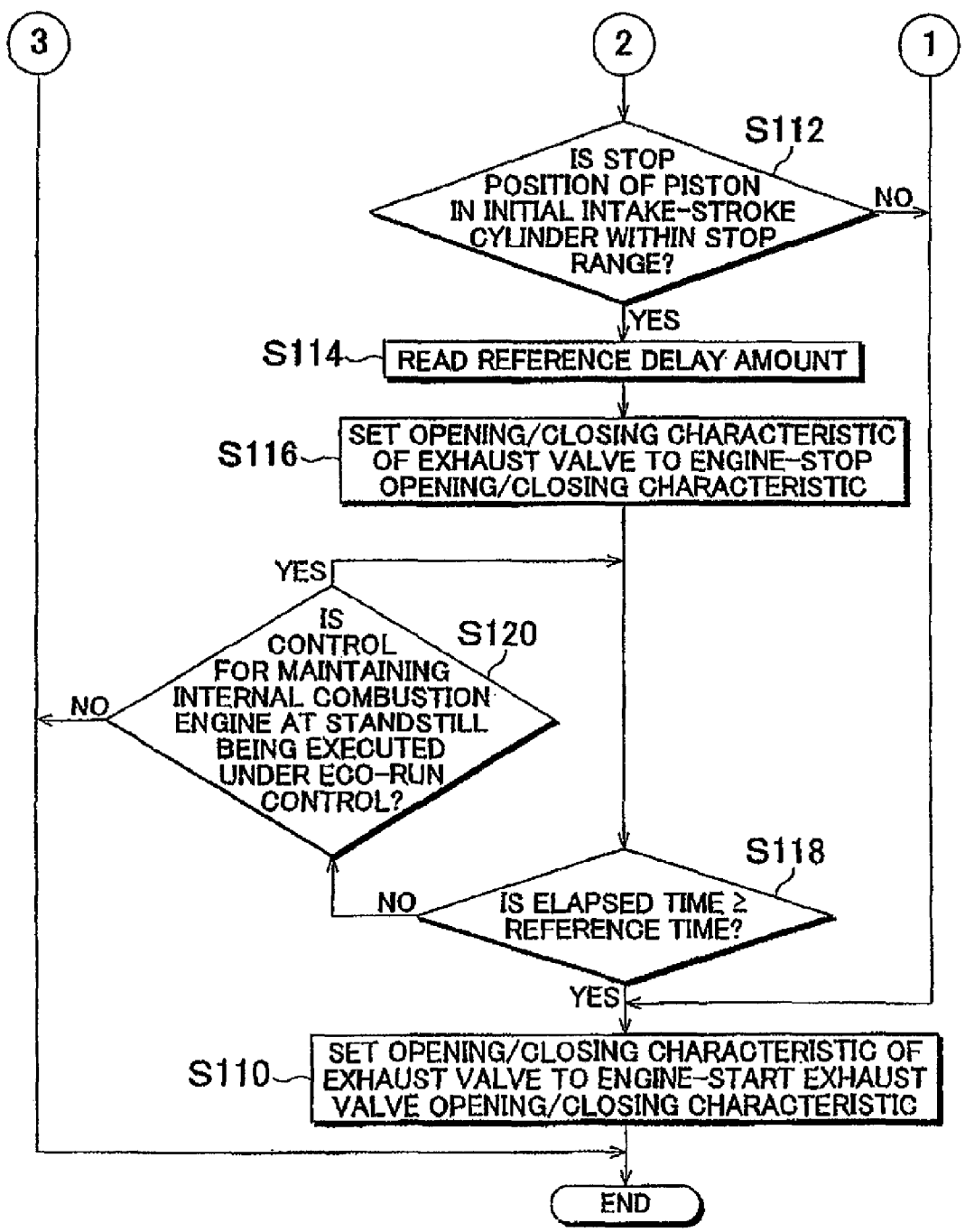

Detailed Description Concerning Control Executed in System According to First Embodiment of the Invention FIG. 4 is a flowchart illustrating the routine of the throttle valve opening amount control executed by the ECU in the first embodiment of the invention. FIG. 5A and FIG. 5B are flowcharts illustrating the routine of the exhaust valve control executed by the ECU) in the first embodiment of the invention. The routines shown in FIGS. 4 and 5 are periodically executed independently of each other.

The throttle valve opening amount is controlled according to the routine in FIG. 4. In the routine in FIG. 4, first, it is determined whether a request to stop the internal combustion engine 10 has been issued tinder the eco-run control. More specifically, the determination is made based on whether the ECU 50 has detected a request to stop the internal combustion engine 10, which is issued by the ECO-ECU 54 when the predetermined conditions, for example, the condition that the vehicle speed becomes zero and the brake pedal is operated, are satisfied (S10). When it is determined in step S10 that no request to stop the internal combustion engine 10 has been issued under the eco-run control, it is not necessary to execute a control for preventing autoignition when the internal combustion engine 10 is being restarted. Therefore, the routine ends.

On the other hand, when it is determined in step S10 that a request to stop the internal combustion engine 10 has been issued under the eco-run control, a control for stopping the internal combustion engine 10, for example, the fuel-supply cutoff control is executed (S12). More specifically, the fuel injection from the port injector 36 is stopped according to a control signal transmitted from the ECU 50. Next, the coolant temperature is detected (S14). More specifically, the ECU 50 detects the temperature of the coolant in the internal combustion engine 10 based on a signal transmitted from the coolant sensor 15, which is arranged near the cylinder 12 of the internal combustion engine 10.

Next, the reference throttle valve opening amount is calculated (S16). The reference throttle valve opening amount is the opening amount by which the throttle valve 42 is open when the internal combustion engine 10 is at standstill in normal times, and calculated according to a map stored in advance. Next, it is determined whether the coolant temperature is equal to or higher than a reference coolant temperature (S18). The reference coolant temperature is determined in advance, for example, by experiment, and stored in the ECU 50. The reference coolant temperature is set to the lower limit of the temperature range in which autoignition is likely to occur. Accordingly, when it is determined in step S18 that the coolant temperature is lower than the reference coolant temperature, there is a low possibility that autoignition will occur. Therefore, when it is determined that the coolant temperature is lower than the reference coolant temperature, the opening amount of the throttle valve 42 is adjusted to the reference throttle valve opening amount calculated in step S16 without executing the autoignition prevention control (S20), after which the routine ends.

On the other hand, when it is determined in step S18 that the coolant temperature is equal to or higher than the reference coolant temperature, autoignition is likely to occur when the internal combustion engine 10 is being restarted. Accordingly, the throttle valve opening amount is adjusted to zero (S22). Thus, the negative pressure produced in the intake pipe 40, at a position on the intake port 24 side increases.

Next, it is determined whether the time that has elapsed since the throttle valve 24 is fully closed is equal to or longer than the reference time Tref (S24). More specifically, the time that has elapsed since the throttle valve 42 is fully closed is measured, and it is determined whether the elapsed time is equal to or longer than the predetermined reference time Tref.

When it is determined in step S24 that the elapsed time is not equal to or longer than the reference time Tref, it is then determined whether the control for maintaining the internal combustion engine 10 at standstill is being executed under the eco-run control (S26). When it is determined that no control for maintaining the internal combustion engine 10 at standstill is being executed under the eco-run control, for example, if a request to start the internal combustion engine 10 is issued and starting of the internal combustion engine 10 is initiated during the control, the routine ends. On the other hand, when the control for maintaining the internal combustion engine 10 at standstill is being executed under the eco-run control, it is then determined whether the time that has elapsed since the throttle valve 42 is fully closed is equal to or longer than the reference time Tref (S24). Accordingly, the state achieved by executing the control for fully closing the throttle valve 42 in step S22 is continued until it is determined that the elapsed time is equal to or longer than the reference time Tref, unless the control for maintaining the internal combustion engine 10 at standstill under the eco-run control is interrupted.

When it is determined in step S24 that the elapsed time is equal to or longer than the reference time Tref, the throttle valve opening amount is adjusted to the reference throttle valve opening amount calculated in step S16 (S20), after which the current control over the throttle valve 42 ends.

The exhaust valve 30 is controlled according to the routine in FIG. 5A and FIG. 5B. In the routine in FIG. 5A and FIG. 5B, first, it is determined whether the internal combustion engine 10 has been stopped under the eco-run control (S102). More specifically, the engine speed is detected based on a signal from the engine speed sensor 16, and whether the internal combustion engine 10 has been stopped under the eco-run control is determined based on whether the engine speed is zero.

Next, the coolant temperature and the stop position of the piston 14 in the initial intake-stroke cylinder are detected (S104). The coolant temperature is detected based on a signal transmitted from the coolant temperature sensor 15. After the cylinder in which the intake stroke is started first from among all the cylinders when the internal combustion engine 10 is restarted (the initial intake-stroke cylinder) is determined based on a signal from the engine speed sensor 16, the stop position of the piston 14 in the initial intake-stroke cylinder is detected.

Next, the engine-start exhaust valve opening/closing characteristic is calculated (S106). The engine-start exhaust valve opening/closing characteristic is calculated as the opening/closing characteristic of the exhaust valve 30, which will be exhibited when the internal combustion engine 10 is being restarted, according to the method stored in the ECU 50 in advance.

Next, it is determined whether the current coolant temperature is equal to or higher than the reference coolant temperature (S108). When it is determined that the current coolant temperature is lower than the reference coolant temperature, autoignition is unlikely to occur when the internal combustion engine 10 is being started. Accordingly, the regular control for starting the internal combustion engine 10 is performed, and therefore the opening/closing characteristic of the exhaust valve 30 is set to the engine-start exhaust valve opening/closing characteristic (S110). More specifically, the ECU 50 calculates the control target value for the variable valve mechanism 34 (Ex. VVT engine-start target value) corresponding to the engine-start opening/closing valve characteristic, and controls the variable valve mechanism 34 according to the engine-start control target value. In this way, the opening/closing characteristic of the exhaust valve 30 is adjusted to the engine-start exhaust valve opening/closing characteristic, after which the routine ends.

On the other hand, when it is determined in step S108 that the coolant temperature is equal to or higher than the reference coolant temperature, autoignition is likely to occur.

Accordingly, it is determined whether the stop position of the piston 14 in the initial intake-stroke cylinder is within the stop range from the TDC on die intake stroke to the crank angle that is reached by delaying the valve timing 90 degrees from the TDC on the intake stroke (S112). When it is determined that the piston stop position is not within the stop range, the opening/closing characteristic of the exhaust valve 30 is adjusted to the engine-start exhaust valve opening/closing characteristic (S110), after which the routine ends.

On the other hand, when it is determined in step S112 that the piston stop position is within the stop range, the reference delay amount X0 used in the autoignition prevention control executed over the exhaust valve 30 of the initial intake-stroke cylinder is read (S114). The reference delay amount X0 is determined in advance and stored in the ECU 50. The reference delay amount X0 is a predetermined delay amount by which the opening/closing timing of the exhaust valve 30 is delayed under the autoignition prevention control.

Next, the opening/closing timing of the exhaust valve 30 of the initial intake-stroke cylinder is delayed by the reference delay amount X0, and the opening/closing characteristic of the exhaust valve 30 is set to the engine-stop opening/closing characteristic (EV1) (S116). More specifically, the control target value (Ex. VVT engine-stop target value) for the variable valve mechanism 34 that delays the opening/closing timing of the exhaust valve 30 by the reference delay amount X0 is calculated, and the variable valve mechanism 34 is controlled according to the engine-stop target value. In this way, the opening/closing characteristic of the exhaust valve 30 of the initial intake-stroke cylinder is adjusted to the engine-stop opening/closing characteristic (EV1).

Next it is determined whether the time that has elapsed since the throttle valve 42 is fully closed in step S22 in the routine in FIG. 4 is equal to or longer than the reference time Tref (S118). When it is determined in step S118 that the elapsed time is not equal to or longer than the reference time Tref, it is then determined whether the control for maintaining the internal combustion engine 10 at standstill is being executed under the eco-run control (S120). Namely it is determined whether the rotational speed of the internal combustion engine 10 is maintained at zero. When it is determined in step S120 that no control for maintaining the internal combustion engine 10 at standstill is being executed, it is estimated that a request to restart the internal combustion engine 10 has been issued. Therefore, the current routine ends and the regular control over the exhaust valve 30 is executed.

On the other hand, when it is determined in step S120 that the control for maintaining the internal combustion engine 10 at standstill is being executed, it is determined whether the time that has elapsed since the throttle valve 42 is fully closed is equal to or longer than the reference time Tref (S118). Accordingly, the state that is achieved by executing the control for delaying the opening/closing timing of the exhaust valve 30 under the autoignition prevention control (S116) is continued until it is determined that the elapsed time is equal to or longer than the reference time Tref, unless it is determined that the internal combustion engine 10 is no longer at standstill.

When it is determined in step S118 that the elapsed time is equal to or longer than the reference time Tref, the opening/closing characteristic of the exhaust valve 30 is adjusted to the engine-start exhaust valve opening/closing characteristic (S110), after which the routine ends.

As described above, with the system according to the first embodiment of the invention, the opening amount of the throttle valve 42 is adjusted to zero when the internal combustion engine 10 is automatically stopped under the eco-run control, and then the exhaust port 28 is opened by delaying the opening/closing timing of the exhaust valve 30 of the initial intake-stroke cylinder. As a result, the amount of exhaust gas recirculated back into the initial intake-stroke cylinder is increased to decrease the ratio of the newly-taken air to the intake air amount, while the internal combustion engine 10 is at standstill. In this way, occurrence of autoignition is prevented.

In the control according to the first embodiment of the invention, the autoignition prevention control is executed during the control for maintaining the internal combustion engine 10 at standstill. During the control maintaining the internal combustion engine 10 at standstill, the opening amount of the throttle valve 42 is adjusted to the reference opening amount used when the internal combustion engine 10 is at standstill, and the opening/closing characteristic of the exhaust valve 30 of the initial intake-stroke cylinder is adjusted to the engine-start opening/closing characteristic. Therefore, it is not necessary to execute the autoignition prevention control when the internal combustion engine 10 is being started. As a result, it is possible to prevent occurrence of autoignition without deteriorating the startability of the internal combustion engine 10.

In the first embodiment of the invention, a "stop request detection unit" according to the invention is implemented by executing step S10, a "coolant temperature determination unit" according to the invention is implemented by executing step S18, a "throttle valve closing unit" according to the invention is implemented by executing step S22, an "elapsed time detection unit" and an "elapsed time determination unit" according to the invention are implemented by executing step S24, and a "reference throttle valve control unit" according to the invention is implemented by executing step S20.

For example, in the first embodiment of the invention, an "engine stop detection unit" according to the invention is implemented by executing step S102, a "stop position detection unit" according to the invention is implemented by executing step S104, a "stop position determination unit" according to the invention is implemented by executing step S112, an "engine-stop exhaust valve control unit" according to the invention is implemented by executing step S116, and a "pre-start exhaust valve control unit" according to the invention is implemented by executing step S110.

A "stop condition determination unit" according to the invention is implemented by determining whether a predetermined stop condition is satisfied using the ECO-ECU 54. An "engine stop unit" according to the invention is implemented by executing the control for stopping the internal combustion engine 10 using the ECU 50 based on a request to stop the internal combustion engine 10, which is issued by the ECO-ECU 54. A "start condition determination unit" according to the invention is implemented by determining using the ECO-ECU 54, that one of the stop conditions is no longer satisfied. An "engine start unit" according to the invention is implemented by executing the control for starting the internal combustion engine 10 using the ECU 50 based on a request to start the internal combustion engine 10, which is issued by the ECO-ECU 54.

In the first embodiment of the invention, the autoignition prevention control is executed by fully closing the throttle valve 42 when the coolant temperature is equal to or higher than the reference coolant temperature. Alternatively, for example, the intake air temperature may be detected based on a signal from the intake air temperature sensor 48, and when the intake air temperature is equal to or higher than the reference intake air temperature, the autoignition prevention control may be executed by controlling the throttle valve 42.

An "intake air temperature determination unit" according to the invention is implemented by determining whether the intake air temperature is equal to or higher than the reference intake air temperature.

Autoignition is likely to occur when the temperature in the cylinder 12 is high. Whether the temperature in the cylinder 12 is high is estimated not only based on the coolant temperature but also based on the intake air temperature to some extent. Accordingly, whether the autoignition prevention control should be executed may be determined using any units that are able to estimate whether the temperature in the cylinder 12 is high to some extent. Whether the autoignition prevention control should be executed may be more reliably determined based on multiple pieces of information such as the coolant temperature and the intake air temperature. However, whether the autoignition prevention control should be executed need not be determined. For example, the autoignition prevention control may always be executed when the internal combustion engine 10 is being started without making the above-described determination. This modification may be made in the following embodiments of the invention.

In the first embodiment of the invention, when the stop position of the piston 14 in the initial intake-stroke cylinder is within the stop range from the TDC on the intake stroke to the crank angle that is reached by delaying the valve timing 90 degrees from the TDC on the intake stroke, the autoignition prevention control is executed. However, whether the autoignition prevention should be executed need not be determined based on the piston stop position. For example, the autoignition prevention control may be executed over any cylinder in which the intake stroke is executed when the internal combustion engine 10 is being restarted, regardless of the piston stop position. This modification may be made in the following embodiments of the invention.

In the first embodiment of the invention, the time that has elapsed since the throttle valve 42 is fully closed is measured, and when the elapsed time is equal to or longer than the reference time Tref, the autoignition prevention control ends. Then, as in the regular control, the opening amount of the throttle valve 42 is adjusted to the reference throttle valve opening amount that is used when the internal combustion engine 10 is at standstill, and the opening/closing characteristic of the exhaust valve 30 is set to the engine-start exhaust valve opening/closing characteristic. However, the timing at which the autoignition prevention control ends is not limited to this. For example, the time that has elapsed since the engine speed becomes zero is measured, and it may be determined whether the autoignition prevention control should be ended based on whether the elapsed time is equal to or longer than the reference time. Alternatively, the time at which the autoignition prevention control ends need not be determined as described above, and the time at which the autoignition prevention control may be set to the time at which it is determined that a request to start the internal combustion engine 10 under the eco-run control has been detected and the internal combustion engine 10 is started. Even in these cases, the amount of exhaust gas recirculated back into the initial intake-stroke cylinder has already been increased. Accordingly, the control for starting the internal combustion engine 10 is immediately started without causing autoignition. Therefore, the startability of the internal combustion engine 10 is enhanced. This modification may be made in the following embodiments.

In the first embodiment of the invention, the autoignition prevention control is executed when the eco-run control is executed. This is because the control for preventing occurrence of autoignition without deteriorating the startability of the internal combustion engine 10 is especially effective when the internal combustion engine 10 is frequently stopped and started within a short time, for example, when the eco-run control is executed. However, the autoignition prevention control may be executed not only when the eco-run control is executed but also when other controls are executed for stopping and then starting the internal combustion engine 10. This modification may be made in the following embodiments.

With the system according to the first embodiment of the invention, the throttle valve 42 and the exhaust valve 30 are controlled independently of each other according to the routine shown in FIG. 4 and the routine shown in FIG. 5A and FIG. 5B, respectively. However, the throttle valve 42 and the exhaust valve 30 need not be controlled according to the routines shown in FIG. 4, FIG. 5A and FIG. 5B, respectively, as long as the above-described control is executed. The throttle valve 42 and the exhaust valve 30 may be controlled according to routines other than the routines shown in FIGS. 4 and 5. For example, the throttle valve 42 and the exhaust valve 30 may be controlled according to one and the same routine. This modification may be made in the following embodiments.

Second Embodiment of the Invention

A system according to a second embodiment of the invention has the same structure as that of the system according to the first embodiment of the invention. The system according to the second embodiment of the invention executes the same control as the control executed by the system according to the first embodiment of the invention except that it is determined, based on the coolant temperature and the stop position of the piston in the initial intake-stroke cylinder, whether the opening/closing timing of the exhaust valve 30 should be delayed by the reference delay amount X0 in the autoignition prevention control that is executed when the internal combustion engine 10 is at standstill.

Figure 6:
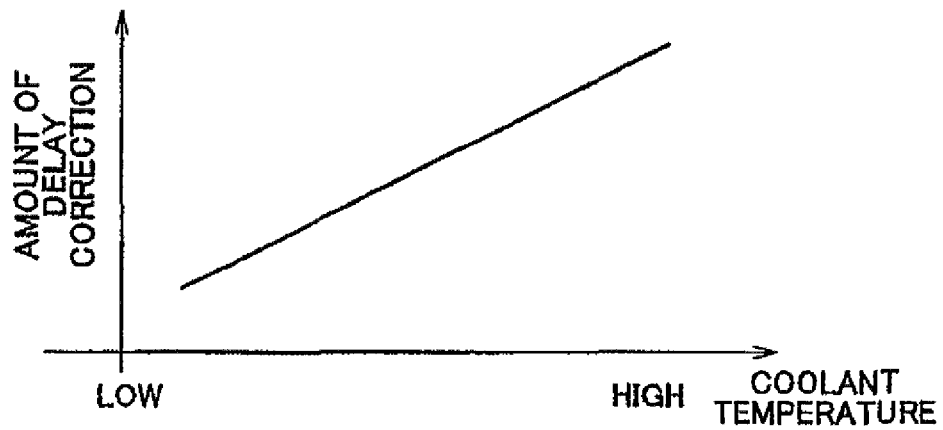
FIG. 6 is a graph illustrating the relationship between the coolant temperature and the corrected amount of delay in the valve timing of the exhaust valve in a second embodiment of the invention.
Figure 7:
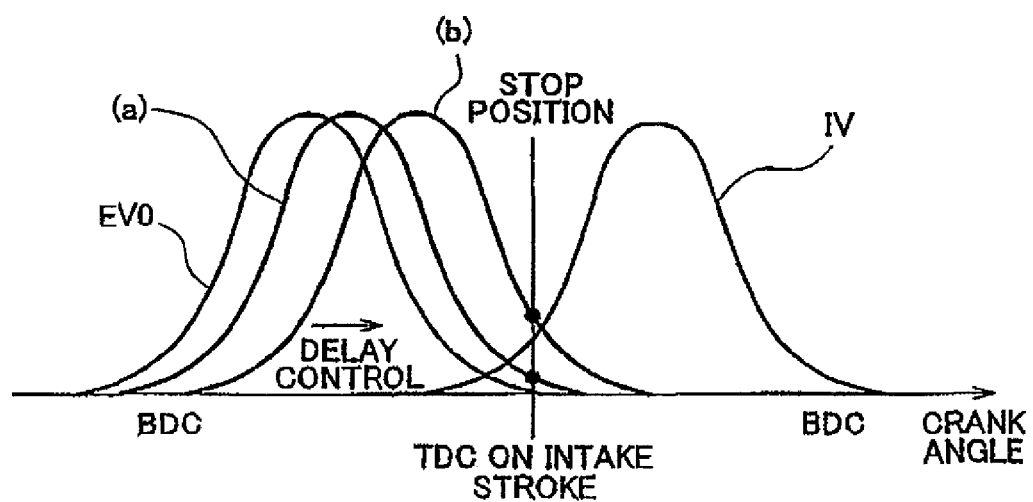
FIG. 7 is a graph illustrating a control for delaying the valve timing of the exhaust valve based on the coolant temperature in the autoignition prevention control according to the second embodiment of the invention.

FIG. 6 is a graph showing the relationship between the coolant temperature and the amount of delay correction made to the reference delay amount X0 for the exhaust valve 30. FIG. 7 is a graph illustrating the opening/closing characteristic of the exhaust valve 30, which is exhibited when the exhaust valve 30 is controlled based on the delay amount that is corrected based on the coolant temperature.

As shown in FIG. 6, the coolant temperature-based delay correction amount X1 by which the reference delay amount X0 is corrected is set to increase as the coolant temperature increases. Accordingly, as shown in FIG. 7, when the piston stop position is the same, the opening amount of the exhaust valve 30 is set to be larger when the coolant temperature is high (indicated by the solid line b) than when the coolant temperature is low (indicated by the solid line a).

When the coolant temperature is high, the temperature in the cylinder 12 is also high. Accordingly, when the internal combustion engine 10 is started in this state, autoignition is likely to occur. Accordingly, as the coolant temperature is higher, the closing timing of the exhaust valve 30 is delayed by a larger amount to increase the opening amount of the exhaust valve 30. When the opening amount of the exhaust valve 30 is increased, the amount of exhaust gas flowing into the initial intake-stroke cylinder 12 is increased because a larger amount of exhaust gas is drawn into the initial intake-stroke cylinder 12 by a negative pressure produced in the intake pipe 40 at a position on the intake port 24 side. As a result, as the temperature in the initial intake-stroke cylinder is higher, the rate of newly-taken air amount to the intake air amount is decreased. In this way, even when the temperature in the cylinder 12 is high, occurrence of autoignition is reliably prevented.

Figure 8:
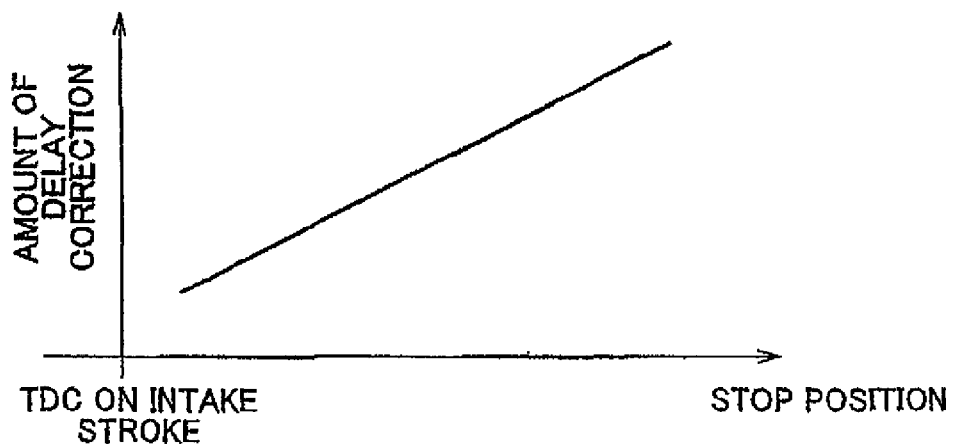
FIG. 8 is a graph illustrating the relationship between the position at which a piston arranged in a specific cylinder is stopped during the intake stroke and the corrected amount of delay in the valve timing of the exhaust valve in the second embodiment of the invention.
Figure 9:
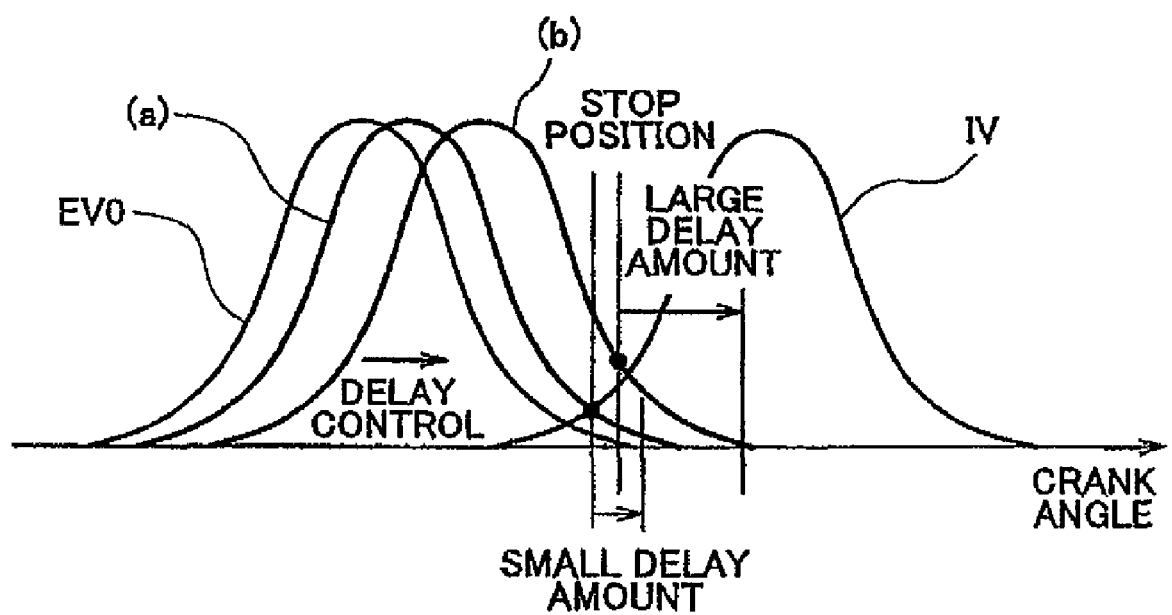
FIG. 9 is a graph illustrating an exhaust valve timing delay control based on the position at which the piston is stopped in the autoignition prevention control according to the second embodiment of the invention.

FIG. 8 is a graph showing the relationship between the piston stop position and the amount of delay correction made to the reference delay amount for the exhaust valve 30. FIG. 9 is a graph showing the opening/closing characteristic of the exhaust valve 30 that is exhibited when opening/closing timing of the exhaust valve 30 is delayed by the delay amount that is corrected based on the piston stop position. As shown in FIG. 8, the delay correction amount X2 for the exhaust valve 30 is set to increase as the piston stop position is closer to the BDC.

As a result, as shown in FIG. 9, the stop-position-based delay correction amount X2 is larger when the piston stop position is close to the BDC than when the stop position is at the TDC on the intake stroke. As the piston 14 is closer to the BDC when the piston 14 is stopped, the temperature in the cylinder 12 is higher and the ratio of the newly-taken air amount to the intake air amount is higher. Therefore, as the piston 14 is closer to the BDC, the amount of exhaust gas recirculated back into the initial intake-stroke cylinder should be increased to reliably reduce the ratio of the newly-taken air amount to the intake air amount. Therefore, as the piston stop position is farther from the TDC on the delay side, the stop-position-based delay correction amount X2 is set to increase.

When the delay amount is set to the predetermined reference delay amount, the amount by which the exhaust port 30 is actually opened becomes smaller as the piston stop position is farther from the TDC and closer to the BDC. Therefore, as the piston stop position is closer to the BDC, the delay amount is made larger as shown by the solid line b in FIG. 9 to keep the exhaust valve 30 open by a certain opening amount even at the piston stop position. On the other hand, when the piston stop position is near the TDC, even when the delay amount for the exhaust valve 30 is small, the exhaust valve 30 is open by a certain amount even at the piston stop position. Therefore, as shown in FIG. 8, the exhaust valve 30 is reliably opened by a desired opening amount during the autoignition prevention control by adjusting the delay amount for the exhaust valve 30 based on the piston stop position.

The relationship between the coolant temperature and the coolant temperature-based delay correction amount X1 shown in FIG. 6 and the relationship between the piston stop position and the stop-position-based delay correction amount X2 shown in FIG. 8 are determined in advance, for example, by experiment, and stored in the ECU 50 in the form of a map. The delay amount for the reference opening/closing characteristic (EV0) of the exhaust valve 30 during the autoignition prevention control is calculated by adding the coolant temperature-based delay correction amount X1 and the stop-position-based delay correction amount X2 to the predetermined reference delay amount X0 for the exhaust valve 30, determined as described in the first embodiment, according to the following equation 1).

Delay amount=reference delay amount X0+coolant temperature-based delay correction amount X1+stop-position-based delay correction amount X2    Equation 1)

As described above, the opening amount of the exhaust valve 30 is increased based on possibility of autoignition by correcting the opening/closing characteristic of the exhaust valve 30 based on the coolant temperature and the piston stop position. Namely, as the possibility of autoignition increases, the opening amount of the exhaust valve 30 during the autoignition prevention control is increased, and the amount of exhaust gas recirculated back into the cylinder is increased during the control for maintaining the internal combustion engine 10 at standstill. Accordingly, it is possible to more reliably prevent occurrence of autoignition based on the state of the internal combustion engine 10.

Figure 10A:
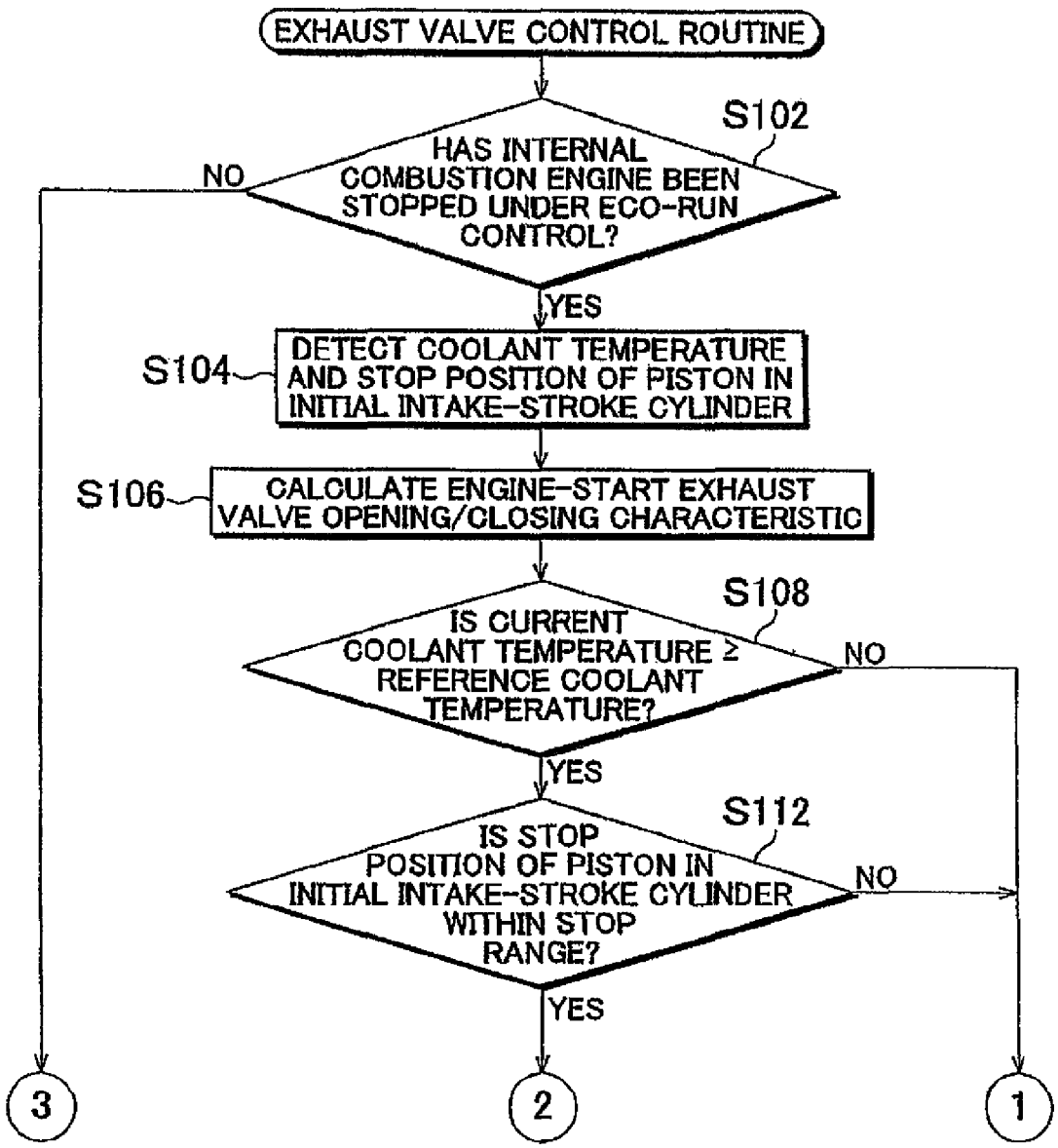
FIG. 10A and FIG. 10B are flowcharts showing the routine of an exhaust valve opening/closing characteristic control executed by the ECU in the second embodiment of the invention.
Figure 10B:
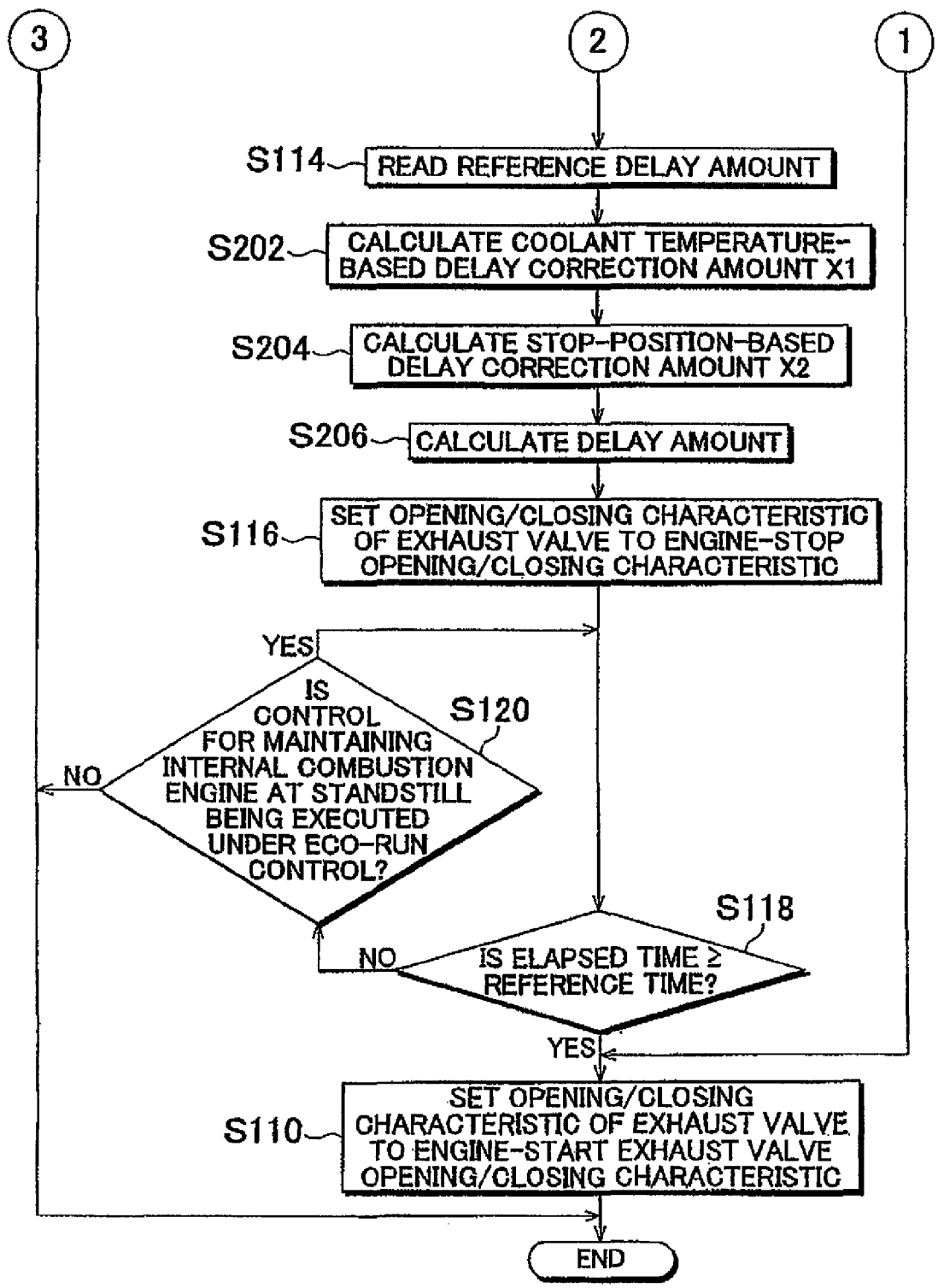

FIG. 10A and FIG. 10B are flowcharts illustrating the exhaust valve control routine executed by the ECU according to the second embodiment of the invention. The routine shown in FIG. 10A and FIG. 10B is the same as the routine shown in FIG. 5A and FIG. 5B, except that steps S202 to S206 are executed after step S114 has been executed. While the routine shown in FIG. 10A and FIG. 10B is executed, the throttle valve opening amount control routine shown in FIG. 4 is executed.

More specifically, in the routine shown in FIG. 10A and FIG. 10B after it is determined that the internal combustion engine 10 has been stopped under the eco-run control and it is determined that the autoignition prevention control should be executed based on the current coolant temperature and the stop position of the piston in the initial intake-stroke cylinder as in steps S102 to S112 in the routine shown in FIG. 5A and FIG. 5B, the reference delay amount X0 stored in the ECU 50 is read in step S114.

Next, the coolant temperature-based delay correction amount X1 is calculated based on the coolant temperature (S202). More specifically, the coolant temperature-based delay correction amount X1 is calculated according to the map, which defines the relationship between the coolant temperature and the delay correction amount X1 and which is stored in the ECU 50 in advance, based on the coolant temperature detected in step S104. As described above, the coolant temperature-based delay correction amount X1 is set to a larger value as the coolant temperature is higher.

Next, the stop-position-based delay correction amount X2 is calculated based on the stop position of the piston in the initial intake-stroke cylinder (S204). More specifically, the stop-position-based delay correction amount X2 is calculated according to the map, which defines the relationship between the stop position and the delay correction amount X2 and which is stored in the ECU 50 in advance, based on the stop position of the piston in the initial intake-stroke cylinder, which is detected in step S104. In this case, the stop-position-based delay correction amount X2 is set to a larger value as the stop position is farther from the TDC.

Next, the delay amount for the exhaust valve 30 of the initial intake-stroke cylinder is calculated according to the above-described equation 1) (S206). More specifically, the delay amount is calculated by adding the coolant temperature-based delay correction amount X1 and the stop-position-based delay correction amount X2 to the reference delay amount X0 that is read in step S114. Next, the opening/closing timing of the exhaust valve 30 is delayed by the delay amount calculated in step S206 (S116).

Then, the opening/closing characteristic of the exhaust valve 30 is maintained at the engine-stop opening/closing characteristic until it is determined in step S118 that the time that has elapsed since the throttle valve 42 is fully closed is equal to or longer than the reference time Tref. When it is determined that the elapsed time is equal to or longer than the reference time Tref, the opening/closing characteristic of the exhaust valve 30 is set to the engine-start opening/closing characteristic (S110).

According to the second embodiment of the invention described above, the opening/closing characteristic of the exhaust valve 30 is set based on the coolant temperature and the stop position of the piston 14 in the initial intake-stroke cylinder. Accordingly, when a negative pressure is produced in the autoignition prevention control, the exhaust valve is reliably opened by a required opening amount to increase the amount of exhaust gas recirculated back into the initial intake-stroke cylinder. Also, as the coolant temperature is higher, the delay amount is made larger. In addition, as the piston stop position is closer to the BDC, the delay amount is made larger. Therefore, as the possibility of autoignition is higher, the amount of exhaust gas recirculated back into the cylinder is made larger, whereby the startability of the internal combustion engine 10 is enhanced.

In the second embodiment of the invention, the delay amount is set based on the coolant temperature. However, the temperature based on which the delay amount is set is not limited to the coolant temperature, and may be any type of temperature as long as the temperature is correlated with the temperature in the cylinder. For example, the delay amount may be set based on the intake air temperature. In this case, the relationship between the intake air temperature and the delay correction amount may be determined in advance, for example, by experiment and stored in the ECU 50. Thus, the control based on the intake air temperature is executed, namely, the amount of exhaust gas recirculated back into the cylinder is adjusted based on the possibility of autoignition.

In the second embodiment of the invention, the delay amount is calculated by adding the coolant temperature-based delay correction amount X1 and the stop-position-based delay correction amount X2 to the reference delay amount X0. However, the method for setting the delay amount is not limited to this. For example, the delay amount may be set by adding the larger value only, selected from among the coolant temperature-based delay correction amount and the stop-position-based delay correction amount, to the reference delay amount. The method for calculating the delay amount may be set in consideration of setting of the delay correction amount based on the relationship between the coolant temperature and the piston stop position.

In the second embodiment of the invention, an "engine-stop exhaust valve opening/closing characteristic setting unit" is implemented by executing steps S114, S202, S204, and S206.

Third Embodiment of the Invention

A system according to a third embodiment of the invention has the same structure as that of the system according to the first embodiment of the invention. The system according to the third embodiment of the invention executes the same control as the control executed by the system according to the second embodiment of the invention except that a control over the opening/closing characteristic of the intake valve 26 is executed during the autoignition prevention control.

Figure 11:
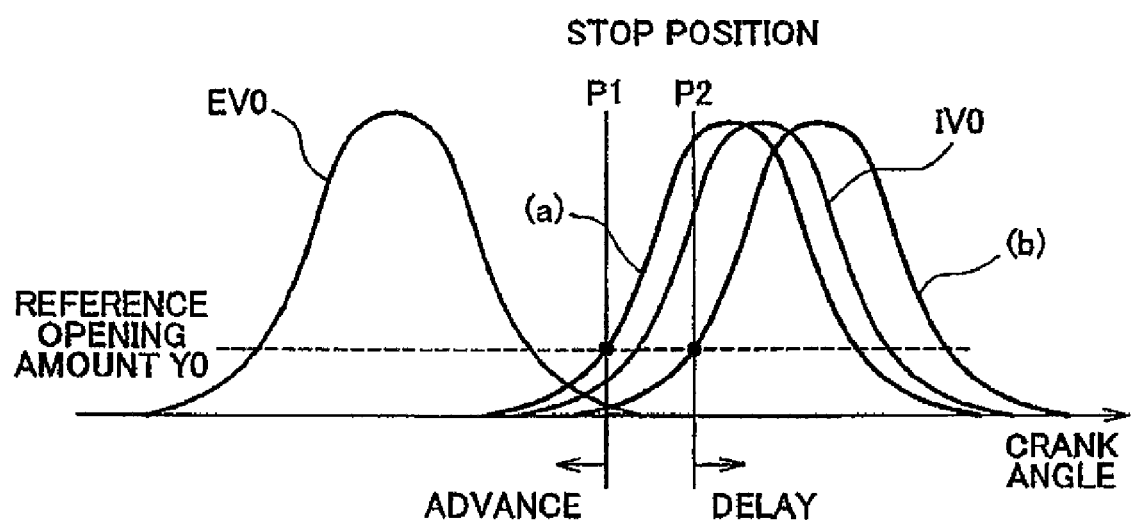
FIG. 11 is a graph illustrating a control over an intake valve in the autoignition prevention control according to a third embodiment of the invention.

FIG. 11 is a graph illustrating the control over the opening/closing characteristic of the intake valve 26 in the system according to the third embodiment of the invention. In the third embodiment of the invention, the opening/closing characteristic of the intake valve 26 is controlled so that the opening amount of the intake valve 26 of the initial intake-stroke cylinder matches a predetermined reference opening amount Y0 (engine-stop reference opening amount) during the autoignition prevention control. Therefore, as shown in FIG. 11, when the piston is stopped at the stop position P1, advance correction is made to the reference opening/closing characteristic (IV0) of the intake valve 26 so that the intake valve 26 exhibits the opening/closing characteristic indicated by the solid line a. In this way, the intake valve 26 is open by the reference opening amount Y0 when the piston 14 is stopped at the stop position P1. On the other hand, when the piston 14 is stopped at the stop position P2, delay correction is made to the reference opening/closing characteristic (IV0) of the intake valve 26 so that the intake valve 26 exhibits the opening/closing characteristic indicated by the solid line b. In this way, the intake valve 26 is open by the reference opening amount Y0 when the piston 14 is stopped at the stop position P2.

The autoignition prevention control is executed to increase the amount of exhaust gas recirculated back into the initial intake-stroke cylinder in which the intake stroke occurs first from among all the cylinders when the internal combustion engine 10 is restarted. However, in the initial intake-stroke cylinder in which the intake stroke occurs first from among all the cylinders when the internal combustion engine 10 is restarted, namely, in the cylinder in which the intake stroke is in progress when the internal combustion engine 10 is stopped, the opening amount of the intake valve 26 greatly varies depending on the stop position of the piston 14. Therefore, even when the opening amount of the exhaust valve 30 is controlled based on the coolant temperature and the piston stop position as described in the second embodiment of the invention, there is a possibility that the amount of exhaust gas recirculated back into the cylinder will not be accurately controlled, depending on the opening amount of the intake valve 26.

However, with the system according to the third embodiment of the invention, the reference opening amount Y0 is set and the opening amount of the intake valve 26 is always adjusted to the reference opening amount Y0. Thus, it is possible to more accurately control the amount of exhaust gas recirculated back into the cylinder by controlling the throttle valve opening amount and the opening/closing characteristic of the exhaust valve 30. Therefore, it is possible to more reliably prevent autoignition from occurring when the internal combustion engine 10 is being started.

Figure 12A:
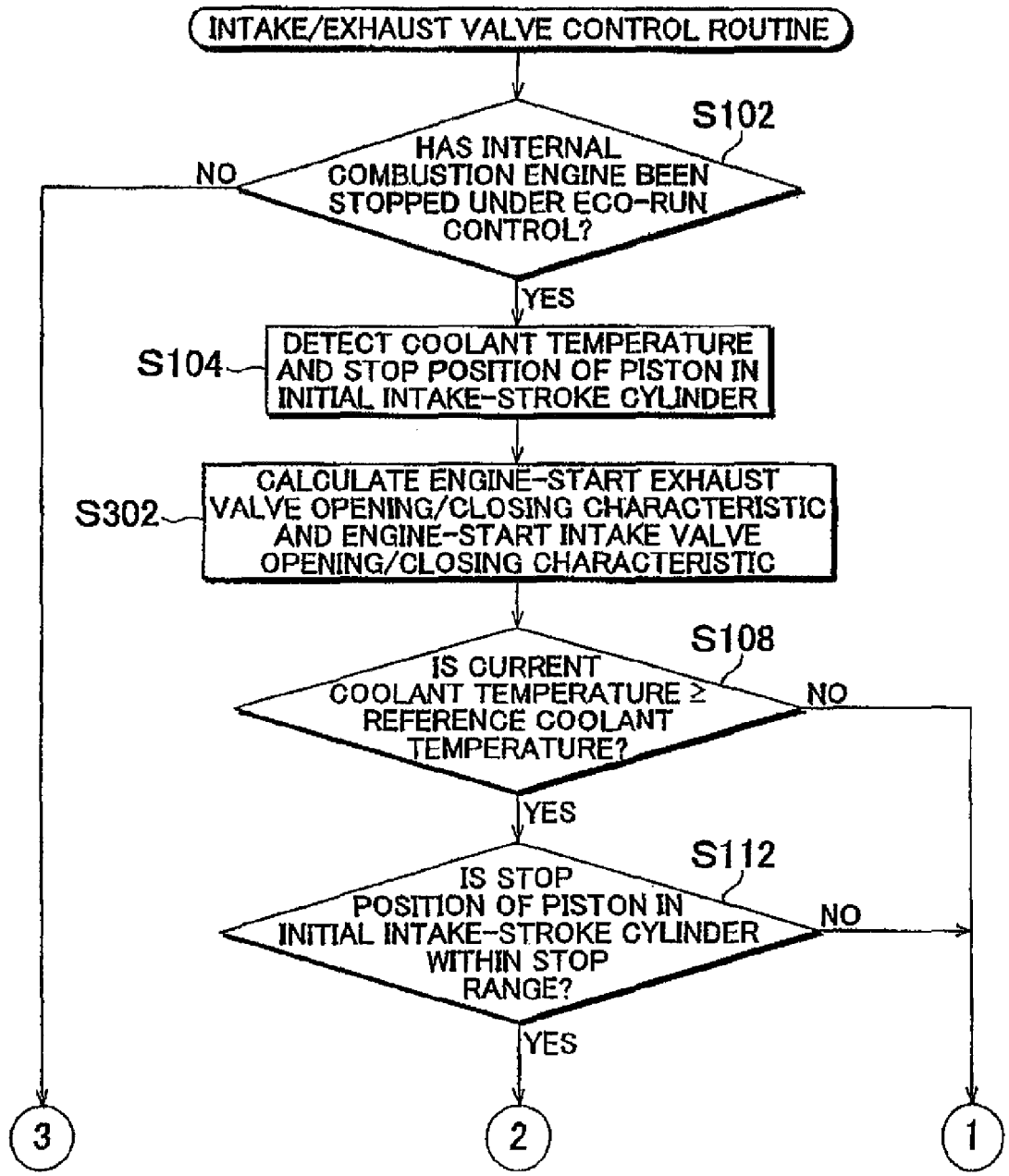
FIG. 12A and FIG. 12B are flowcharts illustrating the routine of an intake/exhaust valve opening/closing characteristic control executed by the ECU in the third embodiment of the invention.
Figure 12B:
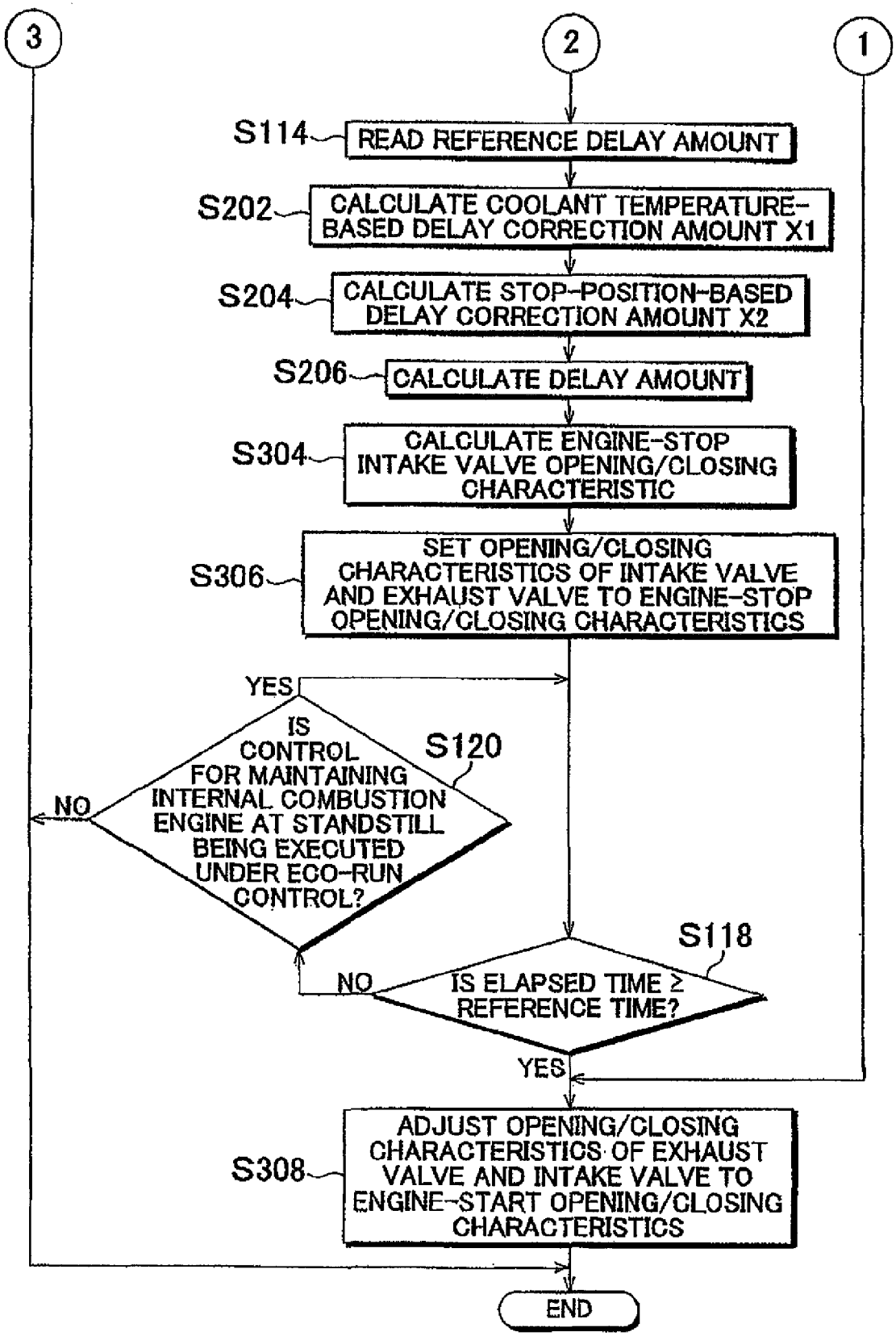

FIG. 12A and FIG. 12B are flowcharts illustrating the control routine executed by the system according to the third embodiment of the invention. The routine shown in FIG. 12A and FIG. 12B is the same as the routine shown in FIG. 10A and FIG. 10B except that step S302 is executed instead of step S106 in FIG. 10A, step S304 is executed after step S206, step S306 is executed instead of step S116 in FIG. 10B, and step S308 is executed instead of step S110 in FIG. 10B.

More specifically, as described in the second embodiment of the invention, after the coolant temperature and the stop position of the piston 14 in the initial intake-stroke cylinder are detected in step S104, the engine-start exhaust valve opening/closing characteristic and the engine-start intake valve opening/closing characteristic, which is the opening/closing characteristic exhibited by the intake valve 26 when the internal combustion engine 10 is being started, are calculated (S302).

Then, after it is determined in steps S108 and S112 that the autoignition prevention control should be executed, based on the coolant temperature and the piston stop position, the engine-stop opening/closing characteristic of the exhaust valve 30 of the initial intake-stroke cylinder is calculated in steps S114 and S202 to S206 by adding the coolant temperature-based delay correction amount X1 and the stop-position-based delay correction amount X2 to the reference delay amount X0.

Next, the engine-stop intake valve opening/closing characteristic of the intake valve 26 is calculated (S304). The engine-stop intake valve opening/closing characteristic is the opening/closing characteristic according to which the opening amount of the intake valve 26 matches the reference opening amount Y0 when the piston in the initial intake-stroke cylinder is stopped.

Next, the opening/closing characteristics of the exhaust valve 30 and the intake valve 26 of the initial intake-stroke cylinder are controlled to the respective engine-stop opening/closing characteristics. More specifically, the control target values for the variable valve mechanisms 32 and 34, which adjust the opening/closing characteristics of the intake valve 26 and the exhaust valve 30 to the engine-stop opening/closing characteristics, are calculated. Then, the variable valve mechanisms 32 and 24 are controlled according to the control target values. Thus, the opening/closing characteristics of the exhaust valve 30 and the intake valve 26 are adjusted to the opening/closing characteristics that should be exhibited during the autoignition prevention control. Namely, the opening amount of the exhaust port 28 is adjusted based on the coolant temperature and the piston stop position, and the opening amount of the intake port 24 is adjusted to the reference opening amount Y0, in the initial intake-stroke cylinder. Because the control over the opening amount of the throttle valve 42 is executed in parallel to the control over the opening/closing characteristics of the intake valve 26 and the exhaust valve 30, a high negative pressure is produced in the intake pipe 40, at a position on the intake port 24 side. Therefore, the exhaust gas is drawn into the initial intake-stroke cylinder through the exhaust port 28 by the negative pressure.

Then, the state that is achieved by controlling the exhaust valve 30 and the intake valve 26 is maintained until it is determined in step S118 that the time that has elapsed since the throttle valve 42 is fully closed is equal to or longer than the reference time Tref, unless the internal combustion engine is no longer at standstill. After it is determined in step S118 that the elapsed time is equal to or longer than the reference time Tref, the opening/closing characteristics of the exhaust valve 30 and the intake valve 26 are adjusted to the engine-start opening/closing characteristics (S308), after which the routine ends.

As described above, according to the third embodiment of the invention, the opening amount of the intake port 24 during the autoignition prevention control is adjusted to the predetermined reference opening amount Y0. At the same time, the opening/closing characteristic of the exhaust valve 30 is adjusted based on the coolant temperature and the piston stop position. Therefore, it is possible to more accurately control the amount of exhaust gas recirculated back into the cylinder based on the possibility of autoignition. As a result, it is possible to prevent occurrence of autoignition more reliably.

In the third embodiment of the invention, the control for adjusting the opening amount of the intake valve 26 to the predetermined reference opening amount Y0 is executed along with the control over the exhaust valve 30, which is executed by the system according to the second embodiment of the invention. However, the control for adjusting the opening amount of the intake valve 26 to the predetermined reference opening amount Y0 may be executed along with another control. For example, the control for adjusting the opening amount of the intake valve 26 to the predetermined reference opening amount Y0 may be executed along with the control for delaying the opening/closing timing of the exhaust valve 30 by the reference delay amount X0. In this way, the amount of exhaust gas recirculated back into the cylinder is estimated to some extent. Therefore, it is possible to more accurately control the amount of exhaust gas recirculated back into the cylinder. The control according to the third embodiment of the invention may be executed in the following embodiments of the invention.

In the third embodiment of the invention, an "engine-stop intake valve control unit" according to the invention is implemented by executing steps S304 and S306, the "elapsed time detection unit" and the "elapsed time determination unit" according to the invention are implemented by executing step S118, and a "pre-start intake valve control unit" according to the invention is implemented by executing step S308.

Fourth Embodiment of the Invention

A system according to a fourth embodiment of the invention has the same structure as that of the system according to the first embodiment of the invention. The system according to the fourth embodiment of the invention executes the same control routine as that executed by the system according to the third embodiment of the invention except that the system according to the fourth embodiment executes the control for adjusting the amount of correction made to the opening/closing characteristic of the intake valve 26 based on the coolant temperature and the piston stop position, in addition to the control over the intake valve 26 executed by the system according to the third embodiment.

Figure 13:
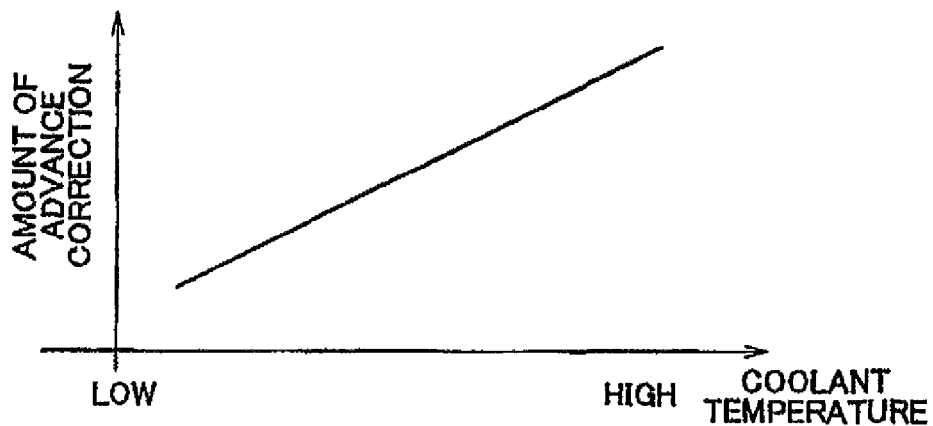
FIG. 13 is a graph illustrating the relationship between the coolant temperature and the advance correction amount in the valve timing of the intake valve in a fourth embodiment of the invention.
Figure 14:
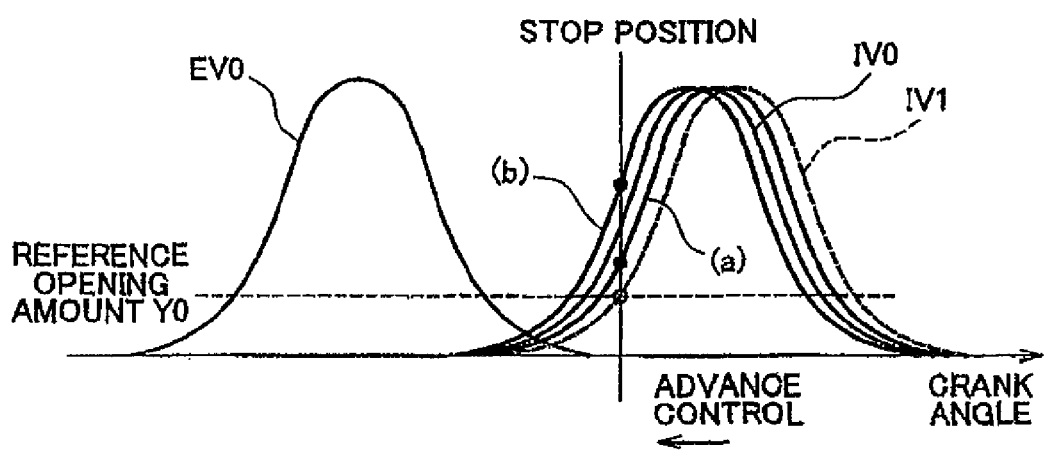
FIG. 14 is a graph illustrating a control for advancing the valve timing of the intake valve based on the coolant temperature in the autoignition prevention control according to the fourth embodiment of the invention.

FIG. 13 is a graph showing the advance correction amount for the intake valve 26 based on the coolant temperature, which is used during the autoignition prevention control. FIG. 14 is a graph illustrating the opening/closing characteristic, which is exhibited by the intake valve 26 when correction is made to the intake valve opening/closing characteristic during the autoignition prevention control based on the coolant temperature. FIG. 13 shows the advance correction amount (coolant temperature-based advance correction amount Y1) for the opening/closing characteristic (IV1) according to which the opening amount of the intake valve 26 of the initial intake-stroke cylinder matches the reference opening amount Y0 during the autoignition prevention control. As shown in FIG. 13, when the coolant temperature is high, the coolant temperature-based advance correction amount Y1 for the opening/closing characteristic of the intake valve 26 during the autoignition prevention control is set to a larger value.

Because the autoignition prevention control is executed when the piston stop position is within the stop range from the TDC on the intake stroke to the crank angle that is reached by delaying the valve timing 90 degrees from the TDC on the intake stroke, the opening amount of the intake valve 26 increases as the advance amount increases, as shown in FIG. 14. Therefore, when the coolant temperature is high, the coolant temperature-based advance correction amount Y1 is set to a larger value as indicated by the solid line b in FIG. 14. Thus, as the coolant temperature is higher, the opening amount of the intake valve 26 is larger. As shown by the solid line a in FIG. 14, as the coolant temperature is lower, the opening amount of the intake valve 26 is smaller. The map that defines the relationship between the coolant temperature and the coolant temperature-based advance correction amount Y1, as shown in FIG. 13, is stored in advance in the ECU 50, and the coolant temperature-based advance correction amount Y1 is calculated based on the coolant temperature according to the map during the autoignition prevention control for the internal combustion engine.

As described above, when the coolant temperature is high, autoignition is likely to occur in the cylinder 12. Therefore, the opening amount of the intake valve 26 is increased to allow a large amount of exhaust gas to be drawn toward the intake port 24 through the exhaust port 28 by the negative pressure. As a result, the amount of exhaust gas recirculated back into the cylinder 12 is increased, and therefore the ratio of newly-taken air amount to the intake air amount when the internal combustion engine 10 is being started is made lower. Thus, it is possible to more reliably prevent occurrence of autoignition.

Figure 15:
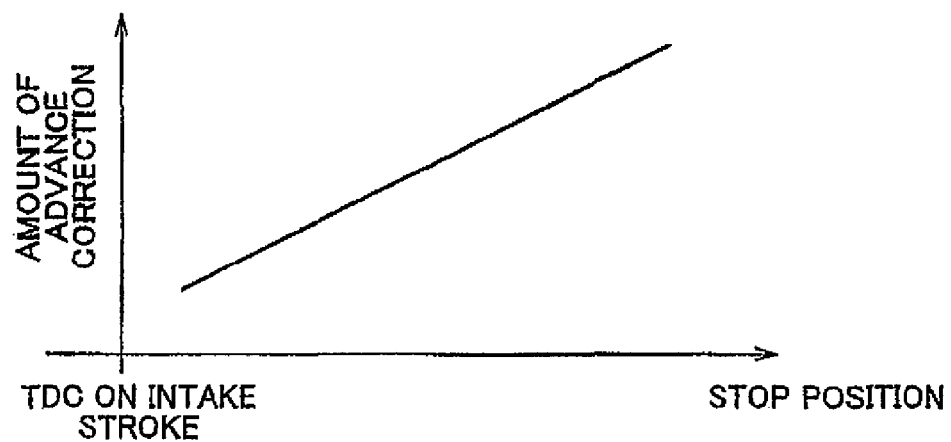
FIG. 15 is a graph illustrating the relationship between the position at which a piston arranged in a specific cylinder is stopped during the intake stroke and the corrected amount of advance in the valve timing of the intake valve in the fourth embodiment of the invention.
Figure 16:
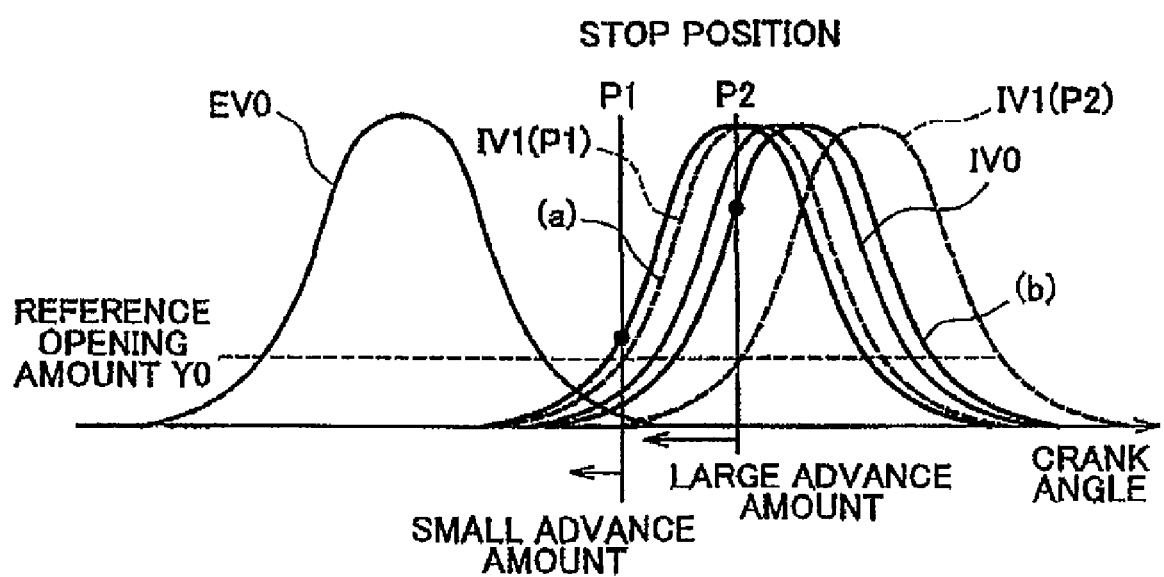
FIG. 16 is a graph illustrating a control for advancing the valve timing of the intake valve based on the position at which the intake valve is stopped in the autoignition prevention control according to the fourth embodiment of the invention.

FIG. 15 is a graph showing the advance amount for the intake valve based on the piston stop position. FIG. 16 is a graph illustrating the opening/closing characteristic that is exhibited by the intake valve 26 when correction is made to the opening/closing characteristic of the intake valve 26 based on the piston stop position. FIG. 15 shows the advance correction amount (stop-position-based correction amount Y2) for the opening/closing characteristic (IV) according to which the opening amount of the intake valve 26 of the initial intake-stroke cylinder matches the reference opening amount Y0. As shown in FIG. 15, as the piston stop position is closer to the BDC, the stop-position-based correction amount Y2 is set to a larger value.

As described above, as the piston stop position is closer to the BDC, autoignition is more likely to occur. Also, as the advance amount is larger, the opening amount of the intake valve 26 is larger. Therefore, as shown by the solid line b in FIG. 16, as the piston stop position is closer to the BDC, the stop-position-based advance correction amount Y2 is set to a larger value, and the opening amount of the intake valve 26 during the autoignition prevention control is made larger. Thus, even when the autoignition is likely to occur, the amount of exhaust gas recirculated back into the cylinder is increased to reduce the possibility that autoignition will occur. The map that defines the relationship between the coolant temperature and the coolant temperature-based advance correction amount Y1 as shown in FIG. 15 is stored in advance in the ECU 50, and the stop-position-based advance correction amount Y2 is calculated based on the piston stop position according to the map during the autoignition prevention control for the internal combustion engine.

Figure 17A:
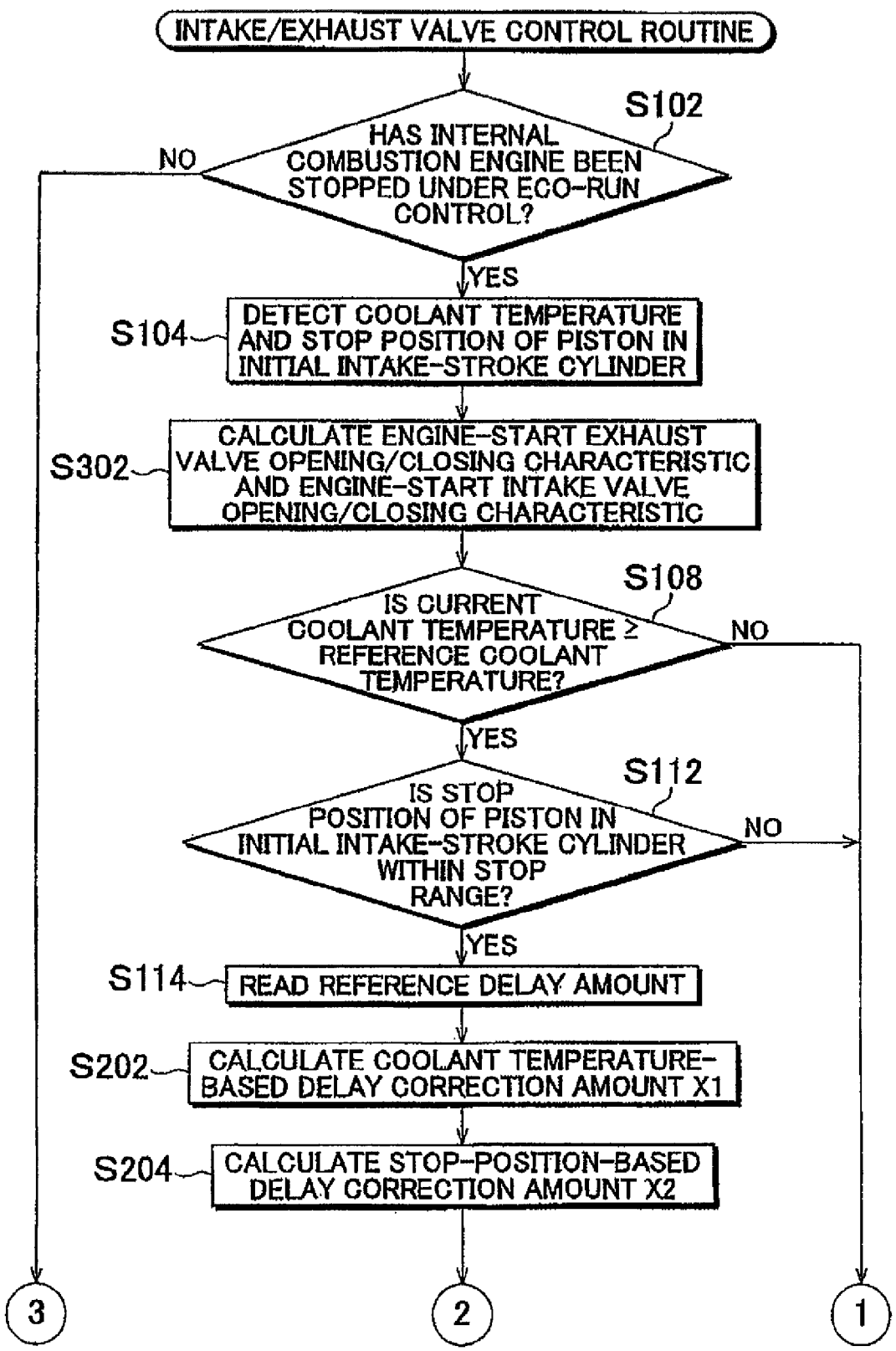
FIG. 17A and FIG. 17B are flowcharts showing the routine of an intake/exhaust valve opening/closing characteristic control executed by the ECU in the fourth embodiment of the invention.
Figure 17B:
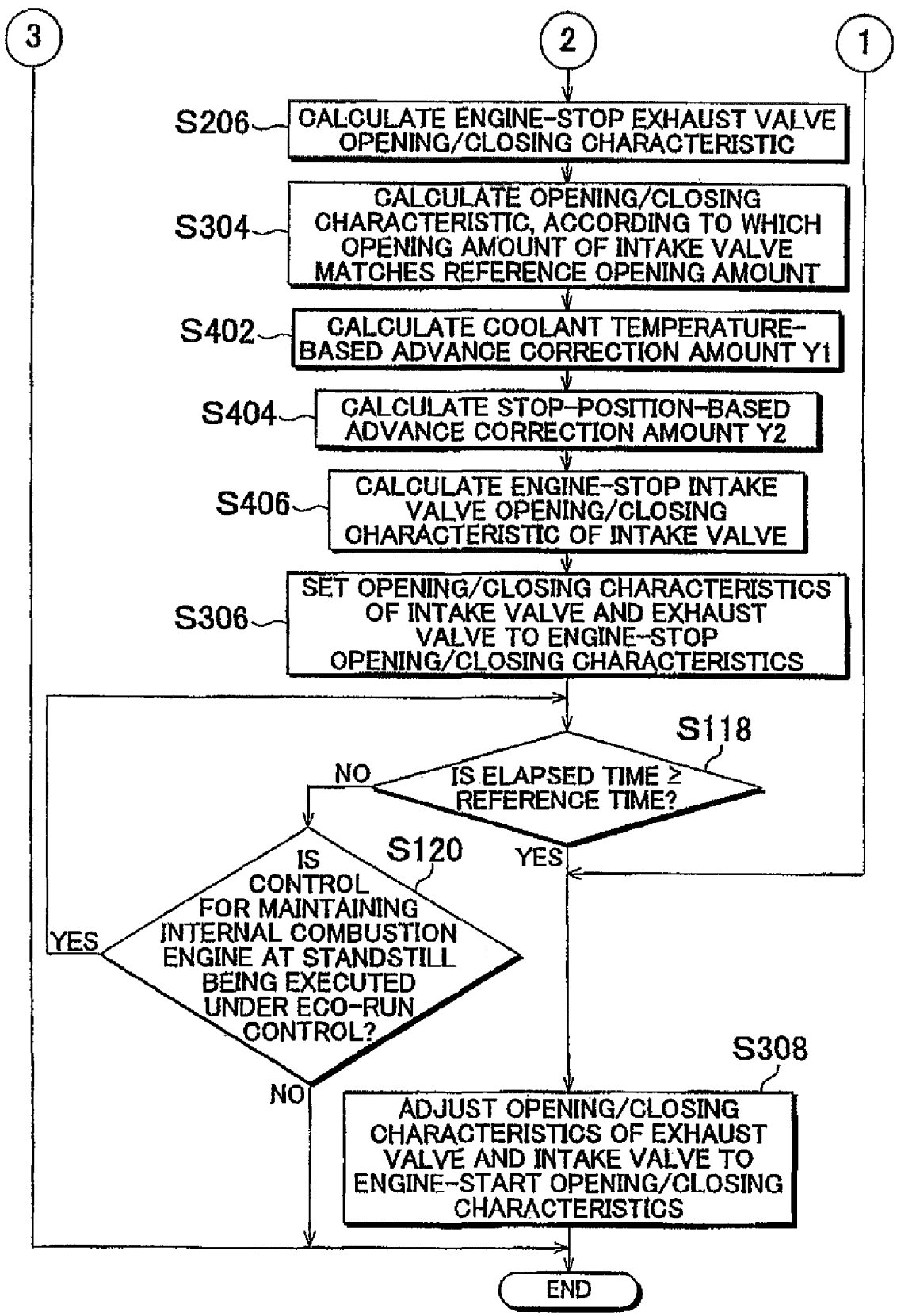

FIG. 17A and FIG. 17B are flowchart showing the routine of the control over the exhaust valve and the intake valve, which is executed by the ECU 50 in the fourth embodiment of the invention. The routine shown in FIG. 17A and FIG. 17B is the same as the routine shown in FIG. 12A and FIG. 12B except that steps S402, S404 and S406 are executed after step S304 in the routine shown in FIG. 12B.

More specifically, in the routine shown in FIG. 17A and FIG. 17B, after the engine-stop opening/closing characteristic of the exhaust valve 30 is calculated in step S206, the opening/closing characteristic (IV1), according to which the opening amount of the intake valve 26 matches the reference opening amount Y0, is calculated in step S304. Then, the coolant temperature-based advance correction amount Y1, which is the amount of correction made to the opening/closing characteristic (IV1) based on the coolant temperature, is calculated (S402). The coolant temperature-based advance correction amount Y1 is calculated according to the map, which defines the relationship between the coolant temperature and the advance correction amount Y1 and which is stored in the ECU 50, based on the coolant temperature calculated in step S104.

Next, the stop-position-based correction amount Y2, which is the amount of correction made to the opening/closing characteristic of the intake valve 26 of the initial intake-stroke cylinder based on the piston stop position, is calculated (S404). The stop-position-based correction amount Y2 is calculated according to the map, which defines the relationship between the piston stop position and the advance correction amount Y2 and which is stored in advance in the ECU 50, based on the piston stop position calculated in step S104.

Next, the engine-stop intake valve opening/closing characteristic of the intake valve 26 of the initial intake-stroke cylinder is calculated (S406). The engine-stop intake valve opening/closing characteristic is calculated by making advance correction to the opening/closing characteristic (IV1), which is calculated in step S304 and according to which the opening amount of the intake valve 26 matches the reference opening amount Y0, by the advance amount calculated by adding the coolant temperature-based advance correction amount Y1 calculated in step S402 to the stop-position-based correction amount Y2 calculated in step S404.

Then, the opening/closing characteristic of the exhaust valve 30 is adjusted to the engine-stop opening/closing characteristic calculated in step S206, and the opening/closing characteristic of the intake valve 26 is adjusted to the engine-stop intake valve opening/closing characteristic calculated in step S404 (S306). The following steps are the same as those in the routine shown in FIG. 12A and FIG. 12B.

According to the fourth embodiment of the invention described above, correction is made, based on the coolant temperature and the piston stop position, to the opening/closing characteristic (IV1) of the intake valve 26 according to which the opening amount of the intake valve 26 matches the predetermined reference opening amount Y0 during the autoignition prevention control. Therefore, the opening amount of the intake valve 26 is set to a larger value as the coolant temperature is higher or as the piston stop position is closer to the BDC. Thus, when autoignition is likely to occur, the amount of exhaust gas recirculated back into the cylinder is increased. As a result, it is possible to more reliably prevent occurrence of autoignition.

In the fourth embodiment of the invention, an "engine-stop reference opening amount correction unit" according to the invention is implemented by executing steps S402, S404 and S406.

In the fourth embodiment of the invention, the advance correction amount for the intake valve 26 is set based on the coolant temperature. However, the advance amount may be set based on any type of temperature as long as the temperature is correlated with the temperature in the cylinder. For example, the advance amount may be set based on the intake air temperature instead of the coolant temperature. In this case as well, the relationship between the intake air temperature and the advance correction amount is determined in advance, for example, by experiment, and stored in the ECU 50. Thus, the control is executed based on the intake air temperature, namely, the amount of exhaust gas recirculated back into the cylinder is adjusted based on the possibility of autoignition. The "engine-stop reference opening amount correction unit" according to the invention is implemented by correcting the reference opening amount by advancing the opening/closing timing of the intake valve based on the intake air temperature.

In the fourth embodiment of the invention, the engine-stop intake valve opening/closing characteristic is calculated by making a correction to the opening/closing characteristic, according to which the opening amount of the intake valve 26 matches the reference opening amount Y0, by the correction amount calculated by adding the coolant temperature-based advance correction amount Y1 to the stop-position-based advance correction amount Y2. However, the method for setting the advance correction amount is not limited to this. For example, the engine-stop intake valve opening/closing characteristic may be calculated by making a correction to the opening/closing characteristic, according to which the opening amount of the intake valve 26 matches the reference opening amount Y0, by the large value only, selected from among the coolant temperature-based advance correction amount and the stop-position-based correction amount to the reference advance amount. The method for calculating the advance amount may be set based on the relationship with setting the advance correction amount based on the coolant temperature and the piston stop position.

Fifth Embodiment of the Invention

Figure 18:
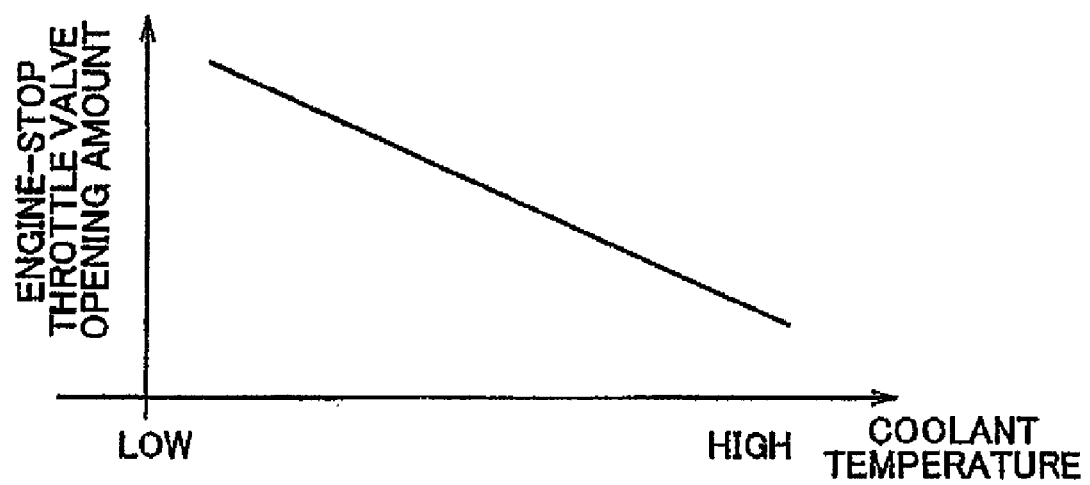
FIG. 18 is a graph illustrating the relationship between the coolant temperature and the opening amount at which a throttle valve is stopped in a fifth embodiment of the invention.

A system according to the fifth embodiment of the invention has the same structure as that of the system shown in FIG. 1. The system according to the fifth embodiment of the invention executes the same control as that executed by the system according to the first embodiment of the invention except that the throttle valve opening amount during the autoignition prevention control is set based on the coolant temperature. FIG. 18 is a graph showing the relationship between the coolant temperature and the throttle valve opening amount in the autoignition prevention control.

More specifically, with the system according to the fifth embodiment of the invention, as shown in FIG. 18, the throttle valve opening amount is set to a value closer to zero as the coolant temperature is higher. Thus, when the coolant temperature is high and autoignition is likely to occur, a negative pressure produced in the intake pipe 40 at a position on the intake port 24 side is made larger.

In the autoignition prevention control, the opening/closing timing of the exhaust valve 30 of the initial intake-stroke cylinder is delayed when the internal combustion engine 10 is at standstill, as in the first embodiment of the invention. Thus, the exhaust valve 30 is kept open. At this time, if the negative pressure generated in the intake pipe 40 at a position on the intake port 24 side is made larger, the amount of exhaust gas drawn into the cylinder 12 through the exhaust valve 30 increases. Accordingly, if the throttle valve opening amount is set to a smaller value as the coolant temperature is higher, the amount of exhaust gas recirculated back into the initial intake-stroke cylinder increases. Therefore, it is possible to more reliably reduce the possibility of autoignition. The relationship between the coolant temperature and the throttle valve opening amount as shown in FIG. 18 is determined in advance, for example, by experiment, and stored in the ECU 50 in the form of a map.

Figure 19:
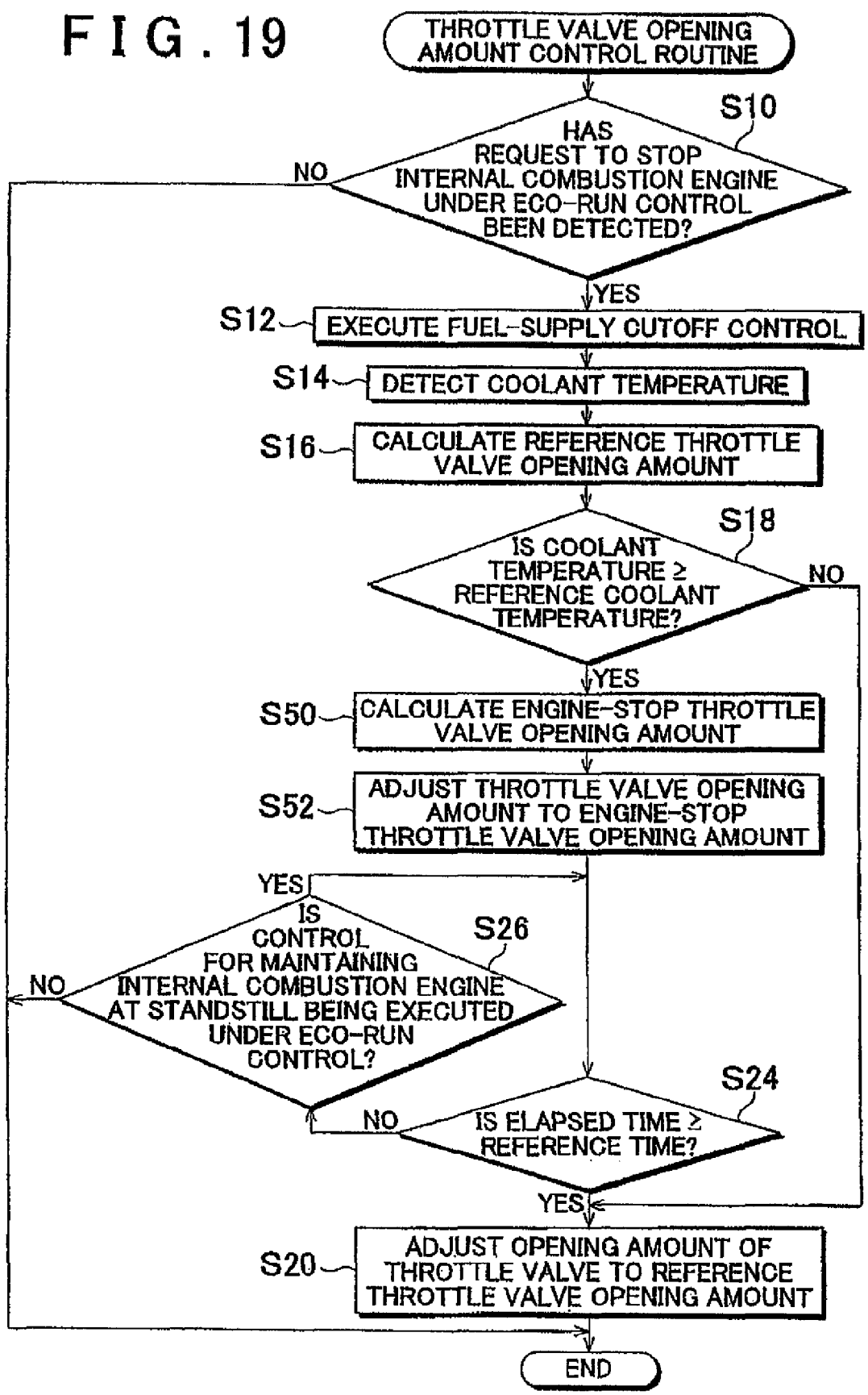
FIG. 19 is a flowchart showing the routine of a throttle valve opening amount control executed by the ECU in the fifth embodiment of the invention.

FIG. 19 is a flowchart showing the routine of the control over the throttle valve, which is executed by the system according to the fifth embodiment of the invention. The routine shown in FIG. 19 is the same as the routine shown in FIG. 4 except that steps S50 and S52 are executed instead of step S22 in the routine shown in FIG. 4.

More specifically, when it is determined in step S18 in the routine shown in FIG. 19 that the coolant temperature is equal to or higher than the reference coolant temperature, the engine-stop throttle valve opening amount is calculated (S50). More specifically, the engine-stop throttle valve opening amount is calculated according to the map that defines the relationship between the coolant temperature and the engine-stop throttle valve opening amount, based on the coolant temperature detected in step S14. Then, the throttle valve opening amount is controlled to the calculated engine-stop throttle valve opening amount (S52).

Then, as in the first embodiment of the invention, the throttle valve opening amount is maintained at the engine-stop throttle valve opening amount until it is determined in step S24 that the time that has elapsed since the throttle valve opening amount is adjusted to the engine-stop throttle valve opening amount is equal to or longer than the reference time, unless it is determined that the stop control under the eco-run control is no longer executed. When it is determined that the elapsed time is equal to or longer than the reference time, the throttle valve opening amount is adjusted to the reference throttle valve opening amount that is achieved when the internal combustion engine is at standstill, after which the current routine ends.

In the fifth embodiment of the invention, an "engine-stop throttle valve opening amount setting unit" is implemented by executing step S50, and an "engine-stop throttle valve control unit" is implemented by executing step S52.

In the fifth embodiment of the invention, the throttle valve opening amount is set based on the coolant temperature. However, the temperature based on which the throttle valve opening amount is set is not limited to the coolant temperature. For example, the intake air temperature may be detected instead of the coolant temperature, and the throttle valve opening amount may be set based on the intake air temperature. When the throttle valve opening amount is set based on the intake air temperature, the "engine-stop throttle valve opening amount setting unit" according to the invention is implemented.

In the fifth embodiment of the invention, the control for adjusting the opening amount of the throttle valve 42 based on the coolant temperature is executed instead of the control for fully closing the throttle valve 42, which is executed by the system according to the first embodiment of the invention. However, control over the opening amount of the throttle valve 42 is not limited to this. For example, the control for adjusting the opening amount of the throttle valve 42 based on the coolant temperature may be executed instead of the control for fully closing the throttle valve 42 during the autoignition prevention control in any one of the second to fourth embodiments of the invention.

Sixth Embodiment of the Invention

A system according to a sixth embodiment of the invention has the same structure as the system shown in FIG. 1. The system shown in FIG. 6 includes a system that executes the following control after the control according to any one of the first to fifth embodiments is executed under the eco-run control, when the internal combustion engine is being started.

Figure 20:
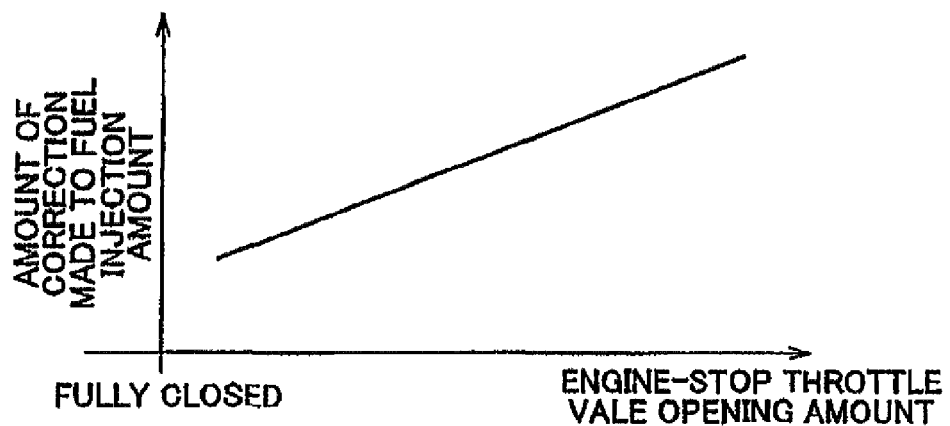
FIG. 20 is a graph illustrating the relationship between the opening amount at which the throttle valve is stopped and the amount of correction made to the fuel injection amount in a sixth embodiment of the invention.
Figure 21:
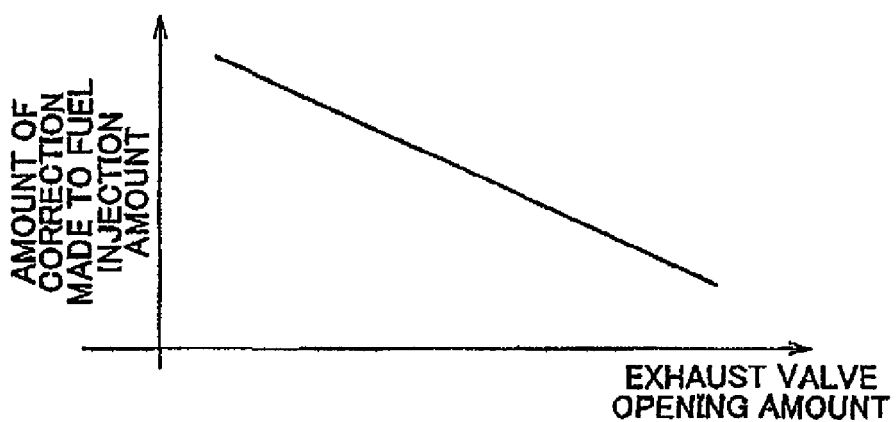
FIG. 21 is a graph illustrating the relationship between the opening amount of the exhaust valve and the amount of correction made to the fuel injection amount in the sixth embodiment of the invention.
Figure 22:
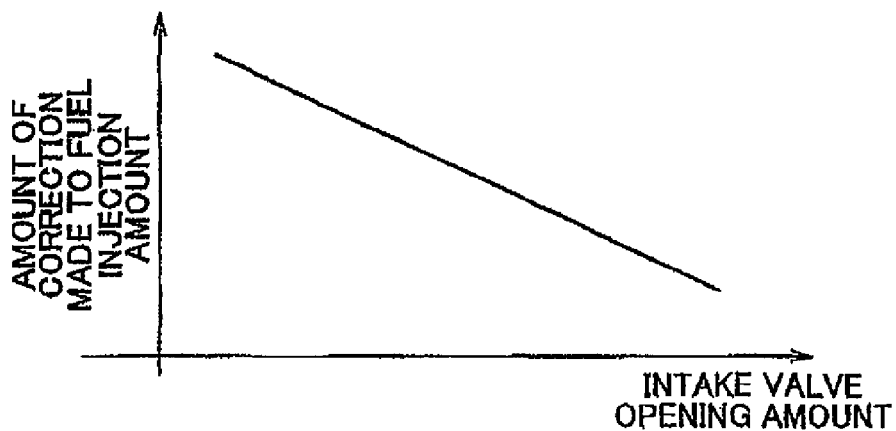
FIG. 22 is a graph illustrating the relationship between the opening amount of the intake valve and the amount of correction made to the fuel injection amount in the sixth embodiment of the invention.

More specifically, the system according to the sixth embodiment of the invention corrects the amount of fuel injected when the internal combustion engine 10 is being started, based on the opening amounts of the exhaust valve 30 and the intake valve 26 and the throttle valve opening amount during the autoignition prevention control. FIG. 20 is a graph showing the relationship between the throttle valve opening amount and the amount of correction made to the fuel injection amount. FIG. 21 is a graph showing the relationship between the opening amount of the exhaust valve and the amount of correction made to the fuel injection amount. FIG. 22 is a graph showing the relationship between the opening amount of the intake valve and the amount of correction made to the fuel injection amount.

As the engine-stop throttle valve opening amount in the autoignition prevention control is made larger, a negative pressure generated in the intake pipe 40 is lower. Therefore, it is estimated that the amount of exhaust gas recirculated back into the cylinder 12 during the autoignition prevention control is smaller. Namely, during the intake stroke that takes place when the internal combustion engine 10 is being started under the eco-run control, the amount of newly-taken air is larger. Therefore, for example, when the throttle valve opening amount is controlled based on the coolant temperature during the autoignition prevention control, as in the fifth embodiment of the invention, as the throttle valve opening amount during the autoignition prevention control increases, the amount of correction made to the fuel injection amount is set to a larger value, as shown in FIG. 20. The map that defines the relationship between the throttle valve opening amount and the fuel injection amount as shown in FIG. 20 is determined in advance, for example, by experiment, and stored in the ECU 50.

It is estimated that as the opening amount of the exhaust valve 30 during the autoignition prevention control is larger, the amount of exhaust gas drawn into the initial intake-stroke cylinder is larger. Accordingly, it is estimated that the amount of exhaust gas present in the cylinder is large and the amount of newly-taken air is small when the internal combustion engine 10 is being started under the eco-run control. Therefore, as the opening amount of the exhaust valve 30 of the initial intake-stroke cylinder during the autoignition control is larger, the amount of correction made to the fuel injection amount is set to a smaller value. The map that defines the relationship between the opening amount of the exhaust valve 30 and the amount of correction made to the fuel injection amount during the autoignition prevention control as shown in FIG. 21 is determined in advance, for example, by experiment, and stored in the ECU 50.

It is estimated that as the opening amount of the intake valve 26 during the autoignition prevention control is larger, the amount of exhaust gas drawn into the initial intake-stroke cylinder is larger. Accordingly, it is estimated that the amount of exhaust gas is large and the amount of newly-taken air is small in the initial intake-stroke cylinder when the internal combustion engine 10 is being started under the eco-run control. Therefore, when the opening/closing characteristic of the intake valve 26 is controlled based on the coolant temperature and the piston stop position, as in the autoignition prevention control according to the fourth embodiment of the invention, as the opening amount of the intake valve 26 of the initial intake-stroke cylinder during the autoignition prevention control is larger, the amount of correction made to the fuel injection amount is made smaller, as shown in FIG. 22. The map that defines the relationship between the opening amount of the intake valve 26 during the autoignition prevention control and the amount of correction made to the fuel injection amount is determined in advance, for example, by experiment, and stored in the ECU 50.

When the fuel injection amount is set, the intake air amount is calculated using the air model based on, for example, the throttle valve opening amount that is achieved when the internal combustion engine is being started, according to the regular calculation method. Then, the reference fuel injection amount is set based on the intake air amount. The correction amounts calculated according to the maps that define the relationships shown in FIGS. 20 to 22 are added to the reference fuel injection amount, whereby the final engine-start fuel injection amount is calculated.

Figure 23:
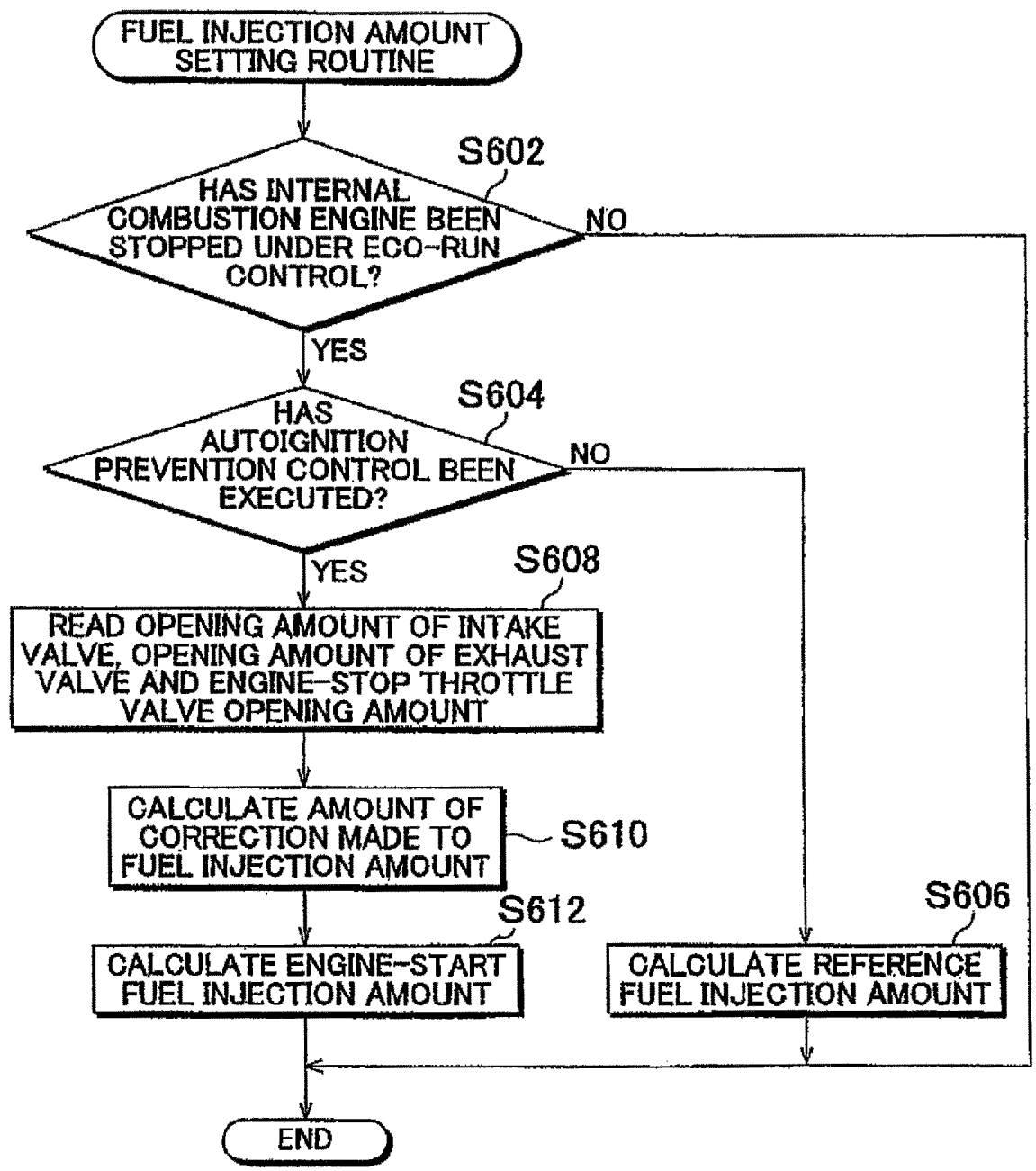
FIG. 23 is a flowchart showing the routine of a fuel injection amount control executed by the ECU in the sixth embodiment of the invention.
Figure 24:
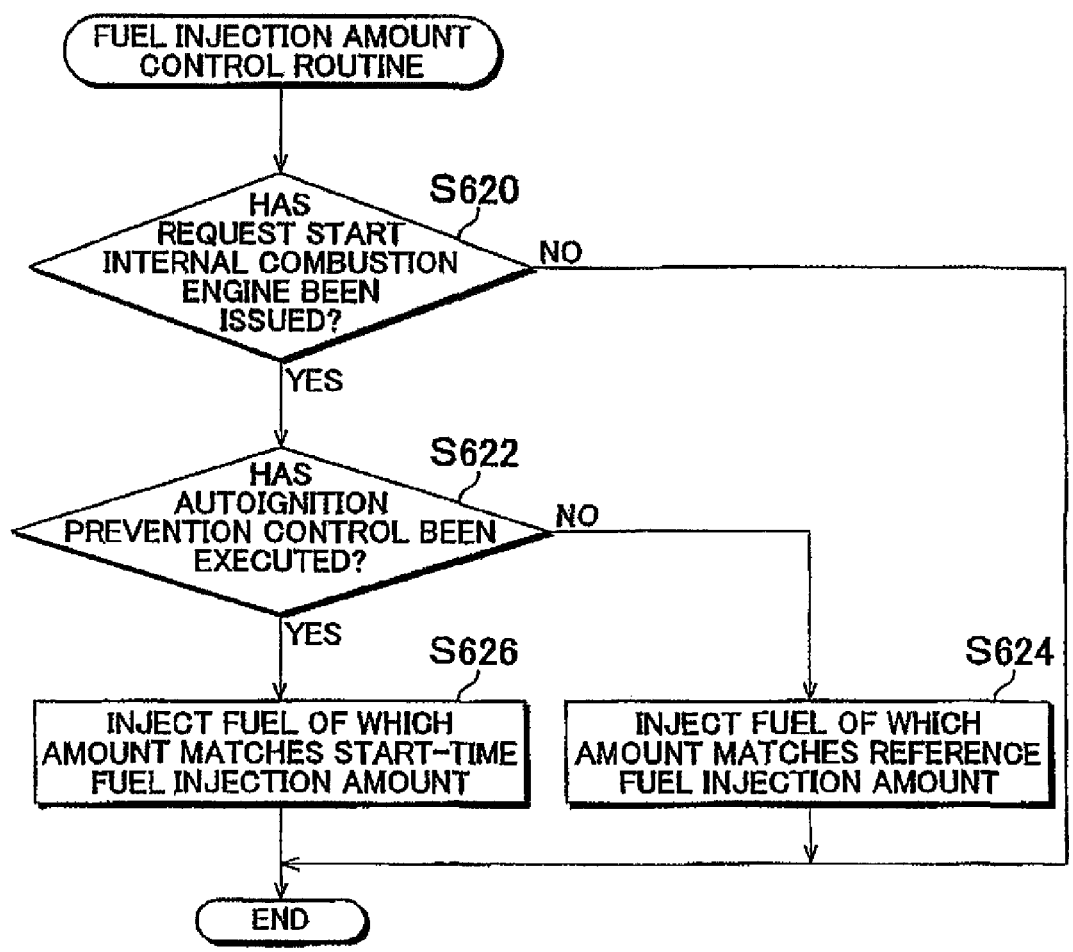
FIG. 24 is a flowchart showing the routine of the fuel injection amount control executed by the ECU in the sixth embodiment of the invention.

FIGS. 23 and 24 are the routines of the fuel injection amount control executed by the system according to the sixth embodiment of the invention. In the routine shown in FIG. 23, first, it is determined whether the internal combustion engine 10 has been stopped under the eco-run control (S602). When it is not determined that the internal combustion engine 10 has been stopped under the eco-run control, the routine ends.

On the other hand, when it is determined that the internal combustion engine 10 has been stopped under the eco-run control, it is then determined whether the autoignition prevention control has been executed (S604). More specifically, it is determined whether the autoignition prevention control has been executed based on the history of the control over the throttle valve 42 or the operation history of the variable valve mechanisms 32 and 34 during the eco-run stop control. When it is determined that the autoignition prevention control has not been executed, the reference fuel injection amount used when the internal combustion engine is restarted is calculated according to the regular calculation method (S606), after which the routine ends.

On the other hand, when it is determined in step S604 that the autoignition prevention control has been executed, the opening amount of the intake valve 26, the opening amount of the exhaust valve 30 and the engine-stop throttle valve opening amount during the autoignition prevention control are read (S608). Next, the amount of correction made to the fuel injection amount is calculated according to the maps (see FIGS. 20 to 22) stored in advance in the ECU 50, based on the opening amounts of the intake valve 26 and the exhaust valve 30 and the engine-stop throttle valve opening amount read in step S608 (S610).

Text, the engine-start fuel injection amount used when the internal combustion engine is restarted is calculated (S612) The engine-start fuel injection amount is calculated by correcting the reference fuel injection amount calculated according to the regular calculation method by the correction amount calculated in step S610, after which the routine ends.

In the routine shown in FIG. 24, first, it is determined whether a request to start the internal combustion engine 10 has been issued (S620). More specifically, it is determined whether a request to start the internal combustion engine has been issued by the ECO-ECU 54 and the request has been detected by the ECU 50. When it is determined that a request to start the internal combustion engine 10 has not been issued, the routine ends.

On the other hand, when it is determined in step S620 that a request to start the internal combustion engine 10 has been issued, it is then determined whether the autoignition prevention control has been executed (S622). When it is determined in S622 that the autoignition prevention control has not been executed, a control is executed so that the fuel of which the amount matches the reference fuel injection amount calculated in step S606 in the routine shown in FIG. 23 is injected at a predetermined timing (S624), after which the routine ends.

On the other hand, when it is determined in step S622 that the autoignition prevention control has been executed, a control is executed so that the fuel of which the amount matches the start-time fuel injection amount calculated in step S612 in the routine shown in FIG. 23 is injected at a predetermined timing (S626), after which the routine ends.

According to the sixth embodiment of the invention described above, when the autoignition prevention control is executed, the fuel injection amount is corrected based on the opening amounts of the intake valve 26 and the exhaust valve 30 and the engine-stop throttle valve opening amount. Therefore, even when the autoignition prevention control is executed and the amount of exhaust gas recirculated back into the initial intake-stroke cylinder is increased, the fuel of which the amount is appropriate with respect to the actual amount of newly-taken air present in the cylinder is injected. Therefore, it is possible to further enhance the startability of the internal combustion engine 10.

With the system according to the sixth embodiment of the invention, the amount of correction made to the fuel injection amount is calculated based on the opening amount of the intake valve 26, the opening amount of the exhaust valve 30, and the engine-stop throttle valve opening amount. However, the fuel injection amount may be set according to another calculation method. For example, the amount of newly-taken air present in the initial intake-stroke cylinder when the internal combustion engine 10 is started may be calculated based on the opening amounts of the intake valve 26 and the exhaust valve 30 and the engine-stop throttle valve opening amount, and the fuel injection amount corresponding to the intake air amount may be set according to the regular calculation method.

In the sixth embodiment of the invention, an "opening amount detection unit" according to the invention is implemented by executing step S608, and a "fuel injection amount setting unit" according to the invention is implemented by executing step S612.

Seventh Embodiment of the Invention

A system according to a seventh embodiment of the invention has the same structure as that of the system shown in FIG. 1. The system in FIG. 7 includes a system that controls the ignition timing when the internal combustion engine is being started, after the control according to any one of the first to fifth embodiments is executed under the eco-run control.

Figure 25:
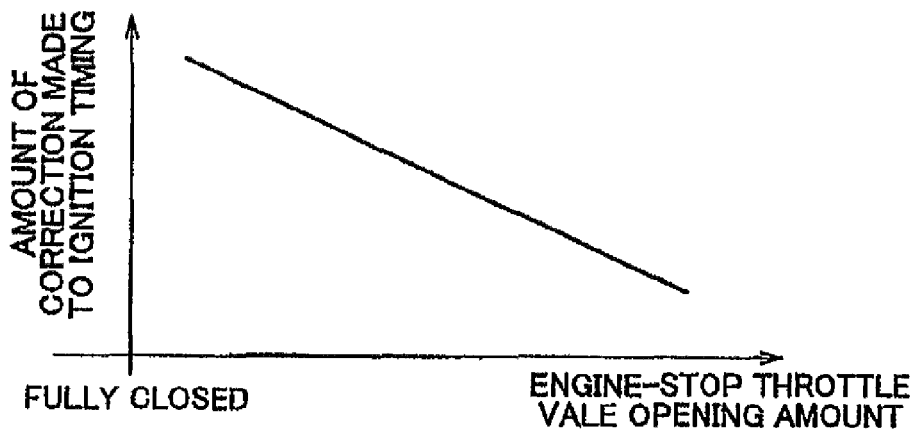
FIG. 25 is a graph illustrating the relationship between the opening amount at which the throttle valve is stopped and the ignition timing in a seventh embodiment of the invention.
Figure 26:
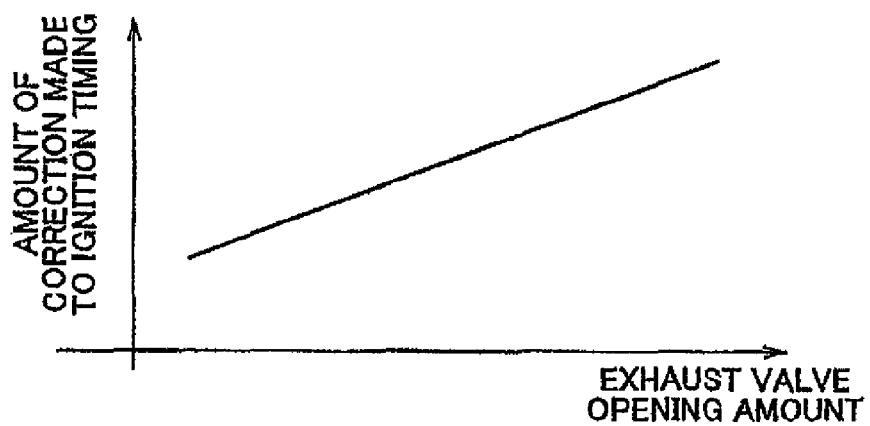
FIG. 26 is a graph illustrating the relationship between the opening amount of the exhaust valve and the ignition timing in the seventh embodiment of the invention.
Figure 27:
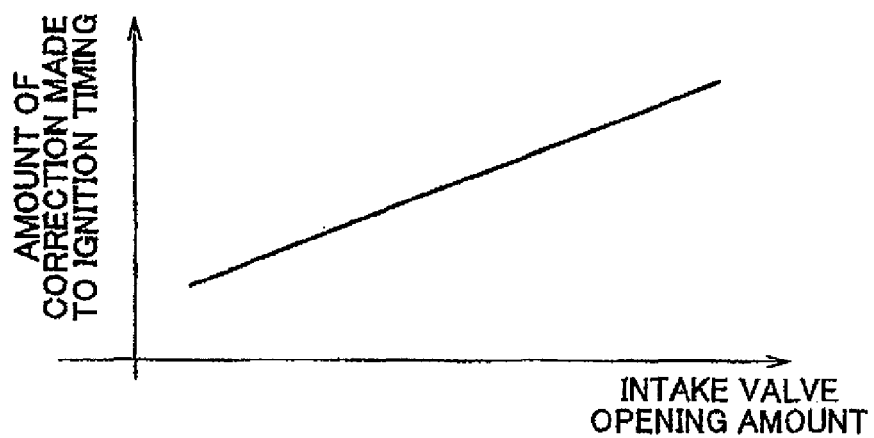
FIG. 27 is a graph illustrating the relationship between the opening amount of the intake valve and the ignition timing in the seventh embodiment of the invention.

FIG. 25 is a graph showing the relationship between the engine-stop throttle valve opening amount and the amount of correction made to the ignition timing during the autoignition prevention control. FIG. 26 is a graph showing the relationship between the opening amount of the exhaust valve of the initial intake-stroke cylinder and the amount of correction made to the ignition timing during the autoignition prevention control. FIG. 27 is a graph showing the relationship between the opening amount of the intake valve and the amount of correction made to the ignition timing during the autoignition prevention control.

During the autoignition prevention control, as the engine-stop throttle valve opening amount is larger, a negative pressure generated is smaller. Accordingly, it is estimated that the amount of exhaust gas recirculated back into the initial intake-stroke cylinder during the autoignition prevention control is small. Namely, the amount of newly-taken air taken into the initial intake-stroke cylinder is large during the intake stroke that takes place when the internal combustion engine 10 is being started under the eco-run control. Accordingly, for example, when the throttle valve opening amount is changed based on the coolant temperature during the autoignition prevention control, as in the fifth embodiment of the invention, as the opening amount of the throttle valve 42 during the autoignition prevention control is smaller, the amount of advance correction made to the ignition timing is larger, as shown in FIG. 25. Namely, the ignition timing is advanced. That is, when the engine-stop throttle valve opening amount is small and the amount of exhaust gas recirculated back into the initial intake-stroke cylinder is large, there is a possibility that the fuel will not be ignited properly when the internal combustion engine is being started. Therefore, the fuel is ignited at an earlier timing to burn the fuel properly even when the amount of exhaust gas recirculated back into the initial intake-stroke cylinder is large. The map that defines the relationship between the engine-stop throttle valve opening amount and the amount of correction made to the ignition timing according to the relationship shown in FIG. 25 is stored in the ECU 50.

It is estimated that as the opening amount of the exhaust valve 30 during the autoignition prevention control is larger, the amount of exhaust gas drawn into the initial intake-stroke cylinder is larger. Accordingly, it is estimated that the air taken in the initial intake-stroke cylinder contains a large amount of exhaust gas and a small amount of newly-taken air when the internal combustion engine 10 is being started under the eco-run control. Therefore, the amount of correction made to the ignition timing is set in such a manner that as the opening amount of the exhaust valve 30 of the initial intake-stroke cylinder during the autoignition prevention control is larger, the ignition timing is more advanced. Thus, when the amount of exhaust gas recirculated back into the initial intake-stroke cylinder is larger, the fuel is ignited at an earlier timing. The ECU 50 stores the map that defines the relationship between the opening amount of the exhaust valve 30 and the amount of correction made to the ignition timing according to the relationship shown in FIG. 26.

Also, it is estimated that as the opening amount of the intake valve 26 during the autoignition prevention control is larger, the amount of exhaust gas drawn into the initial intake-stroke cylinder is larger. Therefore, it is estimated that the air taken in the initial intake-stroke cylinder contains a large amount of exhaust gas and a small amount of newly-taken air when the internal combustion engine 10 is being started under the eco-run control. Therefore, when the opening/closing characteristic of the intake valve 26 is controlled based on the coolant temperature and the piston stop position, as in the autoignition prevention control according to the fourth embodiment of the invention, correction is made in such a manner that as the opening amount of the intake valve 26 increases, the ignition timing is more advanced, as shown in FIG. 27. The ECU 50 stores the map that defines the relationship between the opening amount of the intake valve 26 and the amount of correction made to the ignition timing according to the relationship shown in FIG. 27.

When the ignition timing used when the internal combustion engine is being started after the autoignition prevention control is set, the reference injection timing is calculated according to the regular calculation method. Then, the final ignition timing is calculated by correcting the reference ignition timing by the correction amounts determined based on the relationships shown in FIGS. 25 to 27.

Figure 28:
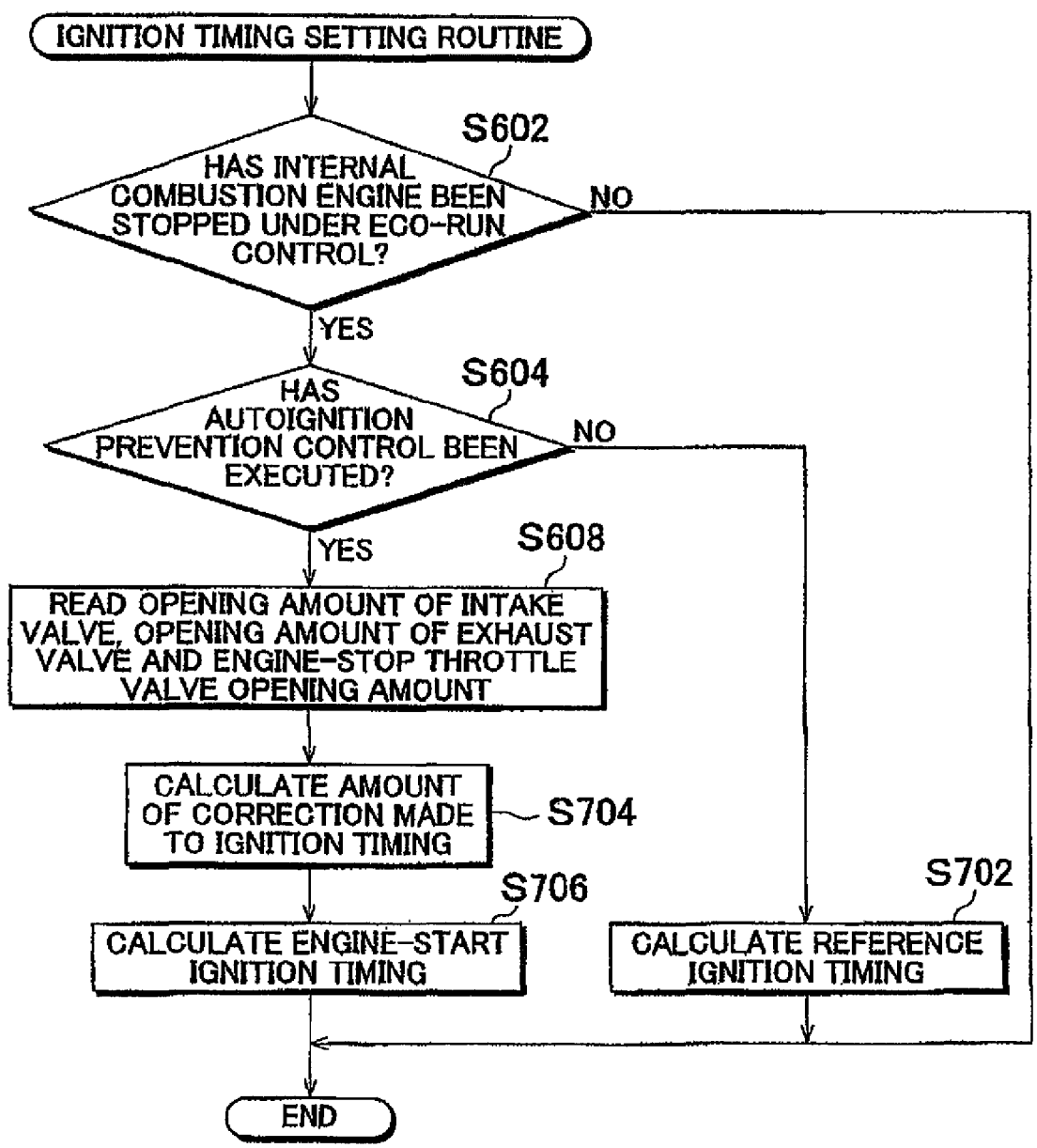
FIG. 28 is a flowchart showing the routine of the ignition timing control executed by the ECU in the seventh embodiment of the invention.

FIGS. 28 and 29 are flowcharts showing the ignition timing control routines executed by the system according to the seventh embodiment of the invention. The routine shown in FIG. 28 is the same as the routine shown in FIG. 23 except that steps S702, S704 and S706 are executed instead of steps S606, S610 and S612. The routine shown in FIG. 29 is the same as the routine shown in FIG. 24 except that steps S710 and S712 are executed instead of steps S624 and S626.

More specifically, in the routine shown in FIG. 28, when it is determined in step S604 that the autoignition prevention control has not been executed, the reference ignition timing set when the internal combustion engine is started in the regular manner is calculated (S702), after which the routine ends. On the other hand, when it is determined in step S604 that the autoignition prevention control has been executed and the opening amounts of the intake valve 26 and the exhaust valve 30 and the engine-stop throttle valve opening amount are read (S608), the amount of correction made to the ignition timing is calculated according to the map stored in advance, based on the opening amounts of the intake valve 26 and the exhaust valve 30 and the engine-stop throttle valve opening amount (S704). Next, the engine-start ignition timing is calculated (S706). More specifically, the engine-start ignition timing is calculated by advancing the reference ignition timing set when the internal combustion engine is started in the regular manner by the correction amount determined in step S704.

In the ignition timing control routine shown in FIG. 29, when it is determined in step S622 that the autoignition prevention control has not been executed, the ignition timing is adjusted to the reference ignition timing (S710), after which the routine ends. On the other hand, when it is determined in step S622 that the autoignition prevention control has been executed the ignition timing is adjusted to the ignition timing calculated in step S706 (S712), after which the routine ends. The routine is executed only at the initial ignition after starting of the internal combustion engine is initiated. After that, the regular engine-start ignition timing control is executed.

According to the seventh embodiment of the invention described above, when the autoignition prevention control is executed, the ignition timing when the internal combustion engine is being started is controlled. Accordingly, when the autoignition prevention control is executed and the amount of exhaust gas recirculated back into the initial intake-stroke cylinder is increased, the ignition timing is advanced and the fuel is more reliably burned even in the initial intake-stroke cylinder when the internal combustion engine is being started.

In the seventh embodiment of the invention, the relationships between the amount of correction made to the injection timing, and the opening amount of the intake valve 26, the opening amount of the exhaust valve 30 and the engine-stop throttle valve opening amount are defined in the form of maps, and the amount of correction made to the reference ignition timing is determined, whereby the ignition timing for the initial intake-stroke cylinder when the internal combustion engine is being started is calculated. However, the method for setting the ignition timing is not limited to this. For example, the amount of newly-taken air in the initial intake-stroke cylinder may be estimated based on the opening amounts of the intake valve and the exhaust valve and the throttle valve opening amount, and the ignition timing may be set based on the estimated amount of newly-taken air.

In the seventh embodiment of the invention, an "opening amount detection unit" according to the invention is implemented by executing step S608, and an "ignition timing setting unit" according to the invention is implemented by executing steps S704 and S706.

In the embodiments of the invention described above, when the number of each element, the quantity, the amount, the range, etc. are described, these are not limited to the ones described above, unless otherwise specified or when they are apparently limited thereto. The structure described in the embodiments and steps in the methods are not limited to those described above unless otherwise specified or when they are limited thereto.

The invention claimed is:

1. A control apparatus comprising:
 a stop request detection unit that detects a stop request to the internal combustion engine;
 a throttle valve closing unit that closes a throttle valve, which is arranged in an intake pipe of the internal combustion engine, when the stop request is detected;
 an engine stop detection unit that detects a stop of the internal combustion engine; and
 an engine-stop exhaust valve control unit that delays a closing timing of an exhaust valve of a specific intake-stroke cylinder that will be placed initially in an intake stroke when the internal combustion engine is restarted with respect to a currently set closing timing, when the throttle valve is closed and a stop of the internal combustion engine is detected.

2. The control apparatus according to claim 1, further comprising:
 a coolant temperature detection unit that detects a coolant temperature of the internal combustion engine; and
 a coolant temperature determination unit that determines whether the coolant temperature is equal to or higher than a reference coolant temperature, wherein the throttle valve closing unit closes the throttle valve when it is determined that the coolant temperature is equal to or higher than the reference coolant temperature.

3. The control apparatus according to claim 1, further comprising:
an intake air temperature detection unit that detects an intake air temperature of the internal combustion engine; and
an intake air temperature determination unit that determines whether the intake air temperature is equal to or higher than a reference intake air temperature, wherein the throttle valve closing unit closes the throttle valve when it is determined that the intake air temperature is equal to or higher than the reference intake air temperature.

4. The control apparatus according to claim 1, further comprising:
a stop position detection unit that detects a stop position of a piston of the specific intake-stroke cylinder when the internal combustion engine is stopped; and
a stop position determination unit that determines whether the stop position is within a stop range from a top dead center on an intake stroke to a position that is obtained by delaying 90 degrees from the top dead center on the intake stroke, wherein the engine-stop exhaust valve control unit further delays the closing time of the exhaust valve when it is determined that the stop position is within the stop range.

5. The control apparatus according to claim 1, further comprising:
an elapsed time detection unit that detects time that has elapsed since the throttle valve is closed;
an elapsed time determination unit that determines whether the elapsed time is equal to or longer than a reference time;
a reference throttle valve control unit that, when the elapsed time is equal to or longer than the reference time, sets the opening amount of the throttle valve to a reference opening amount that is used when the internal combustion engine is stopped; and
a pre-start exhaust valve control unit that sets an opening/closing characteristic of the exhaust valve to an engine-start exhaust valve opening/closing characteristic that is used when the internal combustion engine is restarted, when the opening amount of the throttle valve is set to the reference opening amount.

6. The control apparatus according to claim 1, further comprising:
a coolant temperature detection unit that detects a coolant temperature of the internal combustion engine; and
an engine-stop exhaust valve opening/closing characteristic setting unit that sets an engine-stop exhaust valve opening/closing characteristic based on the coolant temperature.

7. The control apparatus according to claim 1, further comprising:
an intake air temperature detection unit that detects an intake air temperature of the internal combustion engine; and
an engine-stop exhaust valve opening/closing characteristic setting unit that sets an engine-stop exhaust valve opening/closing characteristic based on the intake air temperature.

8. The control apparatus according to claim 1, further comprising:
a stop position detection unit that detects a stop position of a piston of the specific intake-stroke cylinder; and
an engine-stop exhaust valve opening/closing characteristic setting unit that sets an engine-stop exhaust valve opening/closing characteristic based on the stop position.

9. The control apparatus according to claim 1, further comprising:
an engine-stop intake valve control unit that adjusts an opening/closing characteristic of an intake valve of the specific intake-stroke cylinder so that an opening amount of the intake valve becomes an engine-stop reference opening amount when the opening amount of the throttle valve is closed and the internal combustion engine is stopped.

10. The control apparatus according to claim 9, further comprising:
a coolant temperature detection unit that detects a coolant temperature of the internal combustion engine; and
an engine-stop reference opening amount correction unit that corrects the engine-stop reference opening amount based on the coolant temperature.

11. The control apparatus according to claim 9, further comprising:
an intake air temperature detection unit that detects an intake air temperature of the internal combustion engine; and
an engine-stop reference opening amount correction unit that corrects the engine-stop reference opening amount based on the intake air temperature.

12. The control apparatus according to claim 9, further comprising:
a stop position detection unit that detects a stop position of a piston of the specific intake-stroke cylinder; and
an engine-stop reference opening amount correction unit that corrects the engine-stop reference opening amount on the basis of the stop position.

13. The control apparatus according to claim 9, further comprising:
an elapsed time detection unit that detects an elapsed time that has elapsed since the throttle valve is closed;
an elapsed time determination unit that determines whether the elapsed time is equal to or longer than a reference time; and
a pre-start intake valve control unit that, when it is determined that the elapsed time is equal to or longer than the reference time, sets the opening amount of the intake valve to an engine-start intake valve opening/closing characteristic when the internal combustion engine is restarted.

14. The control apparatus according to claim 1, further comprising:
a coolant temperature detection unit that detects a coolant temperature of the internal combustion engine; and
an engine-stop throttle valve opening amount setting unit that closes the throttle valve based on the coolant temperature.

15. The control apparatus according to claim 1, further comprising:
an intake air temperature detection unit that detects an intake air temperature of the internal combustion engine; and
an engine-stop throttle valve opening amount setting unit that closes the throttle valve based on the intake air temperature.

16. The control apparatus according to claim 1, characterized by further comprising:

an opening amount detection unit that detects an opening amount of an intake valve and the opening amount of the exhaust valve when the internal combustion engine is at standstill; and a fuel injection amount setting unit that sets a fuel injection amount of the specific intake-stroke cylinder when the internal combustion engine is started based on the opening amount of the intake valve, the opening amount of the exhaust valve and the throttle valve opening amount.

17. The control apparatus according to claim 1, further comprising:
an opening amount detection unit that detects an opening amount of an intake valve and the opening amount of the exhaust valve when the internal combustion engine is at standstill; and
an ignition timing setting unit that sets an ignition timing when the internal combustion engine is started based on the opening amount of the intake valve, the opening amount of the exhaust valve and the throttle valve opening amount.

18. The control apparatus according to claim 1, further comprising:
a stop condition determination unit that determines whether a stop condition of the internal combustion engine is satisfied based on an operating state of the internal combustion engine;
an engine stop unit that stops the internal combustion engine when it is determined that the stop condition is satisfied;
a start condition determination unit that determines whether a start condition is satisfied after the internal combustion engine has been stopped; and
an engine start unit that starts the internal combustion engine when it is determined that the start condition is satisfied.

19. The control apparatus according to claim 1, wherein the engine-stop exhaust valve control unit delays the closing time of the exhaust valve so that the exhaust valve is open when the throttle valve is fully closed, during the stop of the internal combustion engine being detected.

20. A method of controlling an internal combustion engine, comprising:
detecting a stop request to the internal combustion engine;
closing a throttle valve, which is arranged in an intake pipe of the internal combustion engine, when the stop request is detected;
detecting a stop of the internal combustion engine; and
delaying a closing timing of an exhaust valve of a specific intake-stroke cylinder that will be placed initially in an intake stroke when the internal combustion engine is restarted with respect to a currently set closing timing, when the throttle valve is closed and a stop of the internal combustion engine is detected.

21. The method according to claim 20, further comprising:
detecting a coolant temperature of the internal combustion engine; and
determining whether the coolant temperature is equal to or higher than a reference coolant temperature, wherein the throttle valve is closed when it is determined that the coolant temperature is equal to or higher than the reference coolant temperature.

22. The method according to claim 20, further comprising:
detecting an intake air temperature of the internal combustion engine; and
determining whether the intake air temperature is equal to or higher than a reference intake air temperature, wherein the throttle valve is closed when it is determined that the intake air temperature is equal to or higher than the reference intake air temperature.

23. The method according to claim 20, further comprising:
detecting a stop position of a piston of the specific intake-stroke cylinder when the internal combustion engine is stopped; and
determining whether the stop position is within a stop range from a top dead center on an intake stroke to a position that is obtained by delaying 90 degrees from the top dead center on the intake stroke, wherein the closing timing of the exhaust valve is delayed when the stop position is within the stop range.

24. The method according to claim 20, further comprising:
detecting an elapsed time that has elapsed since the throttle valve is closed;
determining whether the elapsed time is equal to or longer than a reference time;
setting, when the elapsed time is equal to or longer than the reference time, the opening amount of the throttle valve to a reference opening amount that is used when the internal combustion engine is stopped; and
setting the opening/closing characteristics of the exhaust valve to an engine-start exhaust valve opening/closing characteristic that is used when the internal combustion engine is restarted, when the opening amount of the throttle valve is set to the reference opening amount.

25. The method according to claim 20, further comprising:
detecting a coolant temperature of the internal combustion engine; and
setting the engine-stop exhaust valve opening/closing characteristic based on the coolant temperature.

26. The method according to claim 20, further comprising:
detecting an intake air temperature of the internal combustion engine; and
setting the engine-stop exhaust valve opening/closing characteristic based on the intake air temperature.

27. The method according to claim 20, further comprising:
detecting a stop position of a piston of the specific intake-stroke cylinder; and
setting the engine-stop exhaust valve opening/closing characteristic based on the stop position.

28. The method according to claim 20, further comprising:
adjusting an opening/closing characteristic of an intake valve of the specific intake-stroke cylinder so that an opening amount of the intake valve becomes an engine-stop reference opening amount when the throttle valve is closed and the internal combustion engine is stopped.

29. The method according to claim 28, further comprising:
detecting a coolant temperature of the internal combustion engine; and
correcting the engine-stop reference opening amount based on the coolant temperature.

30. The method according to claim 28, further comprising:
detecting an intake air temperature of the internal combustion engine; and
correcting the engine-stop reference opening amount based on the intake air temperature.

31. The method according to claim 28, further comprising:
detecting a stop position of a piston of the specific intake-stroke cylinder, and correcting the engine-stop reference opening amount on the basis of the stop position.

32. The method according to claim 28, further comprising:
detecting an elapsed time that has elapsed since the opening amount of the throttle valve is closed;
determining whether the elapsed time is equal to or longer than a reference time; and setting the opening amount of the intake valve to an engine-start intake valve opening/closing characteristic when the internal combustion engine is restarted when it is determined that the elapsed time is equal to or longer than the reference time.

33. The method according to claim 20, further comprising:
detecting a coolant temperature of the internal combustion engine; and
setting the throttle valve opening amount based on the coolant temperature.

34. The method according to claim 20, further comprising:
detecting an intake air temperature of the internal combustion engine; and
setting the throttle valve opening amount based on the intake air temperature.

35. The method according to claim 20, further comprising:
detecting an opening amount of an intake valve and the opening amount of the exhaust valve when the internal combustion engine is at standstill; and
setting a fuel injection amount of the specific intake-stroke cylinder when the internal combustion engine is started based on the opening amount of the intake valve, the opening amount of the exhaust valve and the throttle valve opening amount.

36. The method according to claim 20, further comprising:
detecting an opening amount of an intake valve and the opening amount of the exhaust valve when the internal combustion engine is at standstill; and
setting an ignition timing when the internal combustion engine is started based on the opening amount of the intake valve, the opening amount of the exhaust valve and the throttle valve opening amount.

37. The method according to claim 20, further comprising:
determining whether a stop condition of the internal combustion engine is satisfied based on an operating state of the internal combustion engine;
stopping the internal combustion engine when it is determined that the stop condition is satisfied;
determining whether a start condition is satisfied after the internal combustion engine has been stopped; and
starting the internal combustion engine when it is determined that the start condition is satisfied.

38. The method according to claim 20, wherein
the engine-stop exhaust valve control unit delays the closing time of the exhaust valve so that the exhaust valve is open when the throttle valve is fully closed, during the stop of the internal combustion engine being detected.

* * * * *